US012744293B2

(12) United States Patent
Zhang et al.

(10) Patent No.: US 12,744,293 B2
(45) Date of Patent: Sep. 22, 2026

(54) PHASE SHIFTER INCLUDING AN ADJUSTABLE DIELECTRIC BETWEEN FIRST AND SECOND DIELECTRIC SUBSTRATES WITH CONDUCTIVE PATTERNS AND ALSO INCLUDING SPLIT RING RESONATORS

(71) Applicants: Beijing BOE Technology Development Co., Ltd., Beijing (CN); BOE TECHNOLOGY GROUP CO., LTD., Beijing (CN)

(72) Inventors: Dongdong Zhang, Beijing (CN); Shiqiao Zhang, Beijing (CN); Yafei Zhang, Beijing (CN); Mengwen Jia, Beijing (CN); Xudong Zhang, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 291 days.

(21) Appl. No.: 18/579,401

(22) PCT Filed: Dec. 26, 2022

(86) PCT No.: PCT/CN2022/142046
§ 371 (c)(1),
(2) Date: Jan. 15, 2024

(87) PCT Pub. No.: WO2024/138330
PCT Pub. Date: Jul. 4, 2024

(65) Prior Publication Data
US 2025/0046974 A1 Feb. 6, 2025

(51) Int. Cl.
*H01P 1/18* (2006.01)
*H01Q 3/36* (2006.01)

(52) U.S. Cl.
CPC .............. *H01P 1/181* (2013.01); *H01P 1/184* (2013.01); *H01Q 3/36* (2013.01); *H01P 1/182* (2013.01)

(58) Field of Classification Search
CPC ............ H01P 1/181; H01P 1/184; H01Q 3/36
(Continued)

(56) References Cited

U.S. PATENT DOCUMENTS 11,119,364 B2 * 9/2021 Li et al. .................... H01P 1/18
2005/0190018 A1 9/2005 Kawai et al.

FOREIGN PATENT DOCUMENTS

CN 107394318 A 11/2017
CN 108682926 A 10/2018
(Continued)

OTHER PUBLICATIONS

Ding, Chang et al., "Bifunctional co-design of liquid crystal phase shifter and band-stop filter," Journal of Physics D: Applied Physics, Jul. 31, 2019, pp. 1-7.
(Continued)

*Primary Examiner* — Benny T Lee
(74) *Attorney, Agent, or Firm* — HOUTTEMAN LAW LLC

(57) ABSTRACT

A phase shifter includes first and second dielectric substrates opposite to each other, first and second conductive patterns on a side of the first dielectric substrate close to the second dielectric substrate, a third conductive pattern on a side of the second dielectric substrate close to the first dielectric substrate, and an adjustable dielectric layer between a layer where the first and second conductive patterns are located and a layer where the third conductive pattern is located; the third conductive pattern includes a main structure, and first and second branches connected to the main structure on two sides of an extending direction thereof respectively; the
(Continued)

phase shifter further includes a split ring resonator on a side of the second dielectric substrate away from the third conductive pattern, and orthographic projections of the split ring resonator and the third conductive pattern on the first dielectric substrate partially overlap each other.

19 Claims, 34 Drawing Sheets

(58) Field of Classification Search
USPC .......................................................... 333/161
See application file for complete search history.

(56) References Cited

FOREIGN PATENT DOCUMENTS

| | | | |
|---|---|---|---|
| CN | 109193081 | A | 1/2019 |
| CN | 109860963 | A | 6/2019 |
| CN | 110824735 | A | 2/2020 |
| CN | 111490314 | A | 8/2020 |
| CN | 112448105 | A | 3/2021 |
| CN | 113611991 | A | 11/2021 |
| CN | 113728512 | A | 11/2021 |
| CN | 216120679 | U | 3/2022 |

OTHER PUBLICATIONS

Ding, Chang et al., "Design of Filtering Tunable Liquid Crystal Phase Shifter Based on Spoof Surface Plasmon Polaritons in PCB Technology," IEEE Transactions on Components, Packaging and Manufacturing Technology, vol. 9, No. 12, Sep. 23, 2019, pp. 2418-2424.

Ding Chang, "Research on the design method of tunable liquid crystal phase shifters with filtering functions," Doctoral Dissertation, Dec. 2020, Harbin Institute of Technology, Harbin, China.

* cited by examiner

PRIOR ART

PHASE SHIFTER INCLUDING AN ADJUSTABLE DIELECTRIC BETWEEN FIRST AND SECOND DIELECTRIC SUBSTRATES WITH CONDUCTIVE PATTERNS AND ALSO INCLUDING SPLIT RING RESONATORS

TECHNICAL FIELD

The present disclosure relates to the field of communication technology, and particularly to a phase shifter and an electronic device.

BACKGROUND

A development trend, such as miniaturization, integration and high performance, of a modern microwave communication system puts higher requirements on a radio frequency front end circuit, and a multifunctional radio frequency front end component, which is designed to integrate microwave front end components with different functions, is expected to meet the design requirements of miniaturization and integration. A phase shifter and a filter are two devices commonly used in a microwave circuit, and the phase shifter is an important component of the radio frequency front end of the microwave communication system and mainly serves to regulate and control phase information of electromagnetic waves. The phase shifters commonly used in the present microwave communication system mainly include a ferrite phase shifter, a PIN diode phase shifter, a ferroelectric phase shifter, etc. The ferrite phase shifter has higher power capacity (about 100 W), but has large volume and slow response speed, and is commonly used in a frequency band with a frequency less than that of X-band. The PIN diode phase shifter has quick response time, is easy to be integrated with a radio frequency circuit, but has lower power tolerance capacity (less than 1 W) and cannot continuously shift the phase. The ferroelectric phase shifter has advantages of small volume, light weight, low driving power, and the like, but the insertion loss thereof is increased when the frequency is high. In contrast, a liquid crystal phase shifter has advantages of continuous tuning, small volume, light weight, and the like, and the higher the frequency is, the smaller the loss of the liquid crystal phase shifter is, so that the liquid crystal phase shifter can be used for the whole microwave frequency band, and even terahertz frequency band, and has great application potential. Another commonly used radio frequency front-end device in microwave communication systems is a filter. In a conventional design method, the phase shifter and the filter are two discrete devices connected through a conversion structure. With such a design of discrete devices, not only the volume of the radio frequency front end is increased, but also additional insertion loss is introduced, thereby affecting the performance of the whole radio frequency system.

SUMMARY OF THE INVENTION

The present disclosure is directed to at least one of the problems in the related art, and provides a phase shifter and an electronic device.

In a first aspect, an embodiment of the present disclosure provides a phase shifter, comprising a first dielectric substrate and a second dielectric substrate opposite to each other, a first conductive pattern and a second conductive pattern on a side of the first dielectric substrate close to the second dielectric substrate, a third conductive pattern on a side of the second dielectric substrate close to the first dielectric substrate, and an adjustable dielectric layer between a layer where the first conductive pattern and the second conductive pattern are located and a layer where the third conductive pattern is located, wherein the third conductive pattern comprises a main structure, and a first branch and a second branch connected to the main structure on two sides of an extending direction of the main structure, respectively; an orthographic projection of the main structure on the first dielectric substrate is between orthographic projections of the first conductive pattern and the second conductive pattern on the first dielectric substrate; the orthographic projections of the first branch and the first conductive pattern on the first dielectric substrate partially overlap each other, and the orthographic projections of the second branch and the second conductive pattern on the first dielectric substrate partially overlap each other; and the phase shifter further comprises a split ring resonator on a side of the second dielectric substrate away from the third conductive pattern, and an orthographic projection of the split ring resonator on the first dielectric substrate partially overlaps an orthographic projection of the third conductive pattern on the first dielectric substrate.

The number of the split ring resonator is more than one, and the plurality of split ring resonators are sequentially arranged along the extending direction of the main structure.

Each of the plurality of split ring resonators comprises an outer ring and an inner ring nested in the outer ring, and positions of splits of the inner ring and of the outer ring are opposite to each other; any two adjacent ones of the plurality of split ring resonators are staggered, wherein an orthographic projection of the split of the inner ring of one of the two adjacent split ring resonators on the first dielectric substrate is within the orthographic projection of the main structure on the first dielectric substrate, and an orthographic projection of the split of the outer ring of the other one of two adjacent split ring resonators on the first dielectric substrate is within the orthographic projection of the main structure on the first dielectric substrate.

The orthographic projection of the split of the inner ring of one the two adjacent split ring resonators on the first dielectric substrate is within an orthographic projection of a center line of the main structure on the first dielectric substrate.

Each of the plurality of split ring resonators comprises an outer ring and an inner ring nested in the outer ring, and positions of splits of the inner ring and of the outer ring are opposite to each other; any two adjacent ones of the plurality of split ring resonators are staggered, and each of orthographic projections of the splits of the inner rings of the plurality of split ring resonators on the first dielectric substrate is within the orthographic projection of the main structure on the first dielectric substrate.

Each of the orthographic projections of the splits of the inner rings of the plurality of split ring resonators on the first dielectric substrate is within an orthographic projection of a center line of the main structure on the first dielectric substrate.

Each of the plurality of split ring resonators comprises an outer ring and an inner ring nested in the outer ring, and positions of splits of the inner ring and of the outer ring are opposite to each other; any two adjacent ones of the plurality of split ring resonators are staggered, and each of orthographic projections of the splits of the outer rings of the plurality of split ring resonators on the first dielectric substrate is within the orthographic projection of the main structure on the first dielectric substrate.

Each of the orthographic projections of the splits of the outer rings of the plurality of split ring resonators on the first dielectric substrate is within an orthographic projection of a center line of the main structure on the first dielectric substrate.

Each of the plurality of split ring resonators comprises an outer ring and an inner ring nested in the outer ring, and positions of splits of the inner ring and of the outer ring are opposite to each other; and each of orthographic projections of centers of the plurality of split ring resonators on the first dielectric substrate is within the orthographic projection of the main structure on the first dielectric substrate.

Orthographic projections of the splits of the inner rings of the plurality of split ring resonators on the first dielectric substrate are on a same side of the orthographic projection of the main structure on the first dielectric substrate; and orthographic projections of the splits of the outer rings of the plurality of split ring resonators on the first dielectric substrate are on a same side of the orthographic projection of the main structure on the first dielectric substrate.

An extending direction of a line connecting orthographic projections of midpoints of the splits of the inner rings of the plurality of split ring resonators on the first dielectric substrate is the same as the extending direction of the main structure; and an extending direction of a line connecting orthographic projections of midpoints of the splits of the outer rings of the plurality of split ring resonators on the first dielectric substrate is the same as the extending direction of the main structure.

A line connecting the orthographic projections of the centers of the plurality of split ring resonators on the first dielectric substrate coincides with an orthographic projection of a center line of the main structure on the first dielectric substrate.

The split ring resonator is a rectangular split ring resonator or a circular split ring resonator.

Any two adjacent ones of the plurality of split ring resonators differ in size.

The first branches and the second branches are in one-to-one correspondence, and for the first branch and the second branch corresponding to each other, a region where the orthographic projections of the first branch and the first conductive pattern on the first dielectric substrate overlap each other is a first region, a region where the orthographic projections of the second branch and the second conductive pattern on the first dielectric substrate overlap each other is a second region, and the first region and the second region are equal in area.

Each of regions where orthographic projections of the respective first branches and the first conductive pattern on the first dielectric substrate overlap each other is the first region, and areas of the respective first regions monotonically increase in a direction from each of two ends of the main structure toward a center of the main structure.

Widths of the respective first branches are equal to each other, and lengths of the respective first branches monotonically increase in the direction from each of the two ends of the main structure toward the center of the main structure.

Lengths of the respective first branches are equal to each other, and widths of the respective first branches monotonically increase in the direction from each of the two ends of the main structure toward the center of the main structure.

The first branches and the second branches are in one-to-one correspondence, lengths of the respective first branches and the respective second branches are equal to each other, and widths of the respective first branches and the respective second branches are equal to each other.

The first branch, the second branch, and the main structure are of a one-piece structure.

The adjustable dielectric layer is a liquid crystal layer.

In a second aspect, an embodiment of the present disclosure provides an electronic device, which includes any one of the phase shifters described above.

DETAIL DESCRIPTION OF THE EMBODIMENTS

Figure 1:
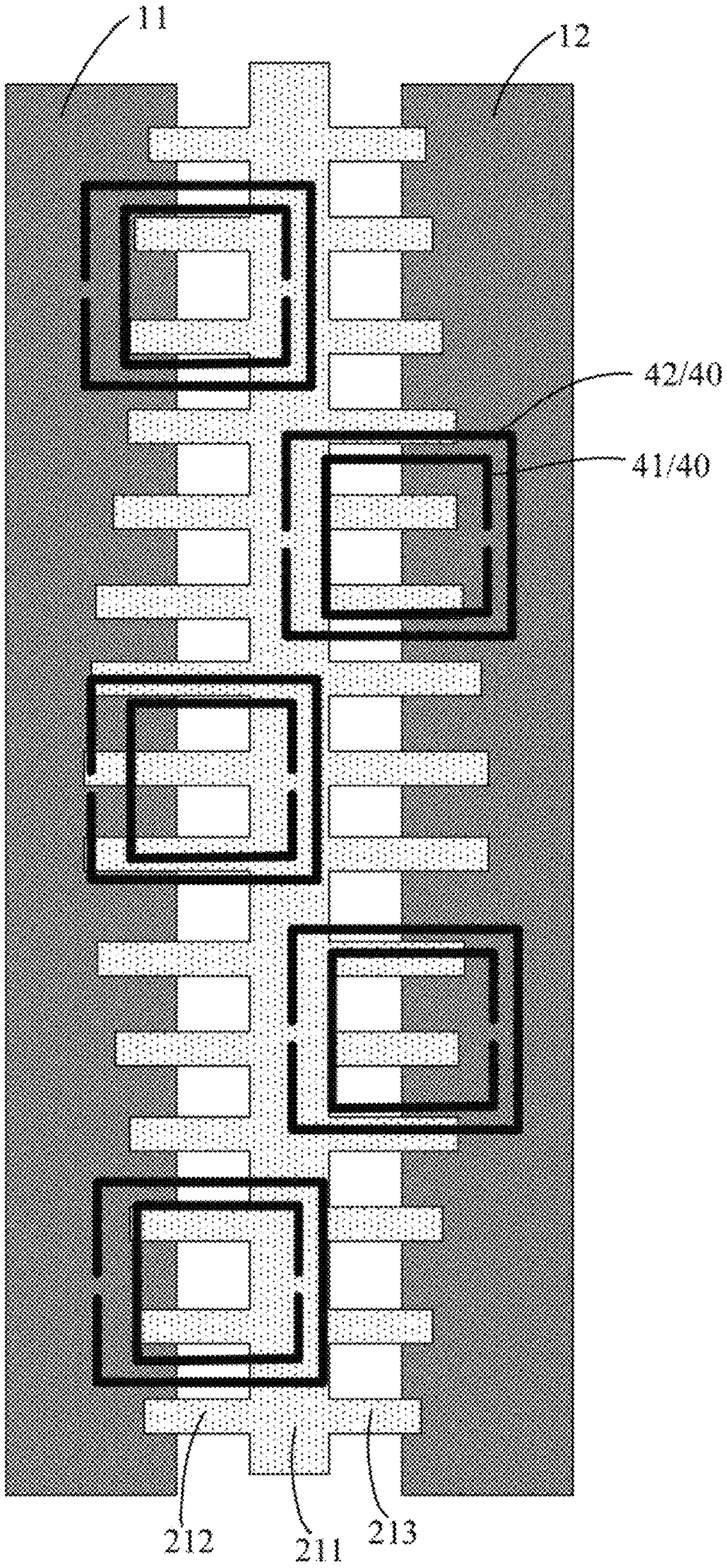
FIG. 1 is a top view of a phase shifter according to an embodiment of the present disclosure.

In order enable one of ordinary skill in the art to better understand the technical solutions of the present disclosure, the present disclosure is further described in detail with reference to the accompanying drawings and the detailed description below.

Unless defined otherwise, technical or scientific terms used herein shall have the ordinary meaning as understood by one of ordinary skill in the art to which the present disclosure belongs. The words "first", "second", and the like used in the present disclosure do not denote any order, quantity, or importance, but rather distinguish one element from another. Likewise, the word "a", "an", or "the" or the like does not denote a limitation of quantity, but rather denotes the presence of at least one. The word "comprising" or "comprises", or the like, means that an element or item preceding the word includes the element or item listed after the word and its equivalent, but does not exclude other elements or items. The word "connected" or "coupled" or the like is not restricted to physical or mechanical connections, but may include electrical connections, whether direct or indirect. "Upper", "lower", "left", "right", and the like are used only to indicate relative positional relationships, and when an absolute position of an object being described is changed, the relative positional relationships may also be changed accordingly.

Before describing the embodiments of the present disclosure, it should be noted that, in the following embodiments of the present disclosure, a liquid crystal phase shifter is taken as an example of the phase shifter, that is, a liquid crystal layer is employed as an adjustable dielectric layer in the phase shifter. It should be understood that the adjustable dielectric layer is not limited to the liquid crystal layer, and any dielectric layer, which has a changeable dielectric constant under an action of an electric field, is within the protection scope of the embodiments of the present disclosure.

A split ring resonator is a kind of magnetic metamaterial. A split ring resonator having a pair of concentric split rings each with a sub-wavelength size can effectively change permeability. Principle of the split ring resonator is as follows. A metal ring generates an induced electromagnetic field in a varying magnetic field perpendicular to the ring, but is not a resonant system. In order to generate a resonant enhanced magnetic response, a capacitor is required to be introduced. Since an inductor and a capacitor together form a resonant circuit (the metal ring may be regarded as an inductor), a split is formed in each metal ring, so that a capacitor is formed, and charges can be accumulated at two ends of the split ring. Thus, the split ring resonator behaves like a resonant circuit with two capacitors. The reason why the two split rings are used lies in that the charges accumulated in a single split ring may generate an electric dipole moment to weaken the desired electric/magnetic dipole moment, and the electric dipole moments generated by the two split rings with splits opposite to each other will balance each other, so that a structure of a dual split ring resonator is adopted in the metamaterial design.

Figure 2:
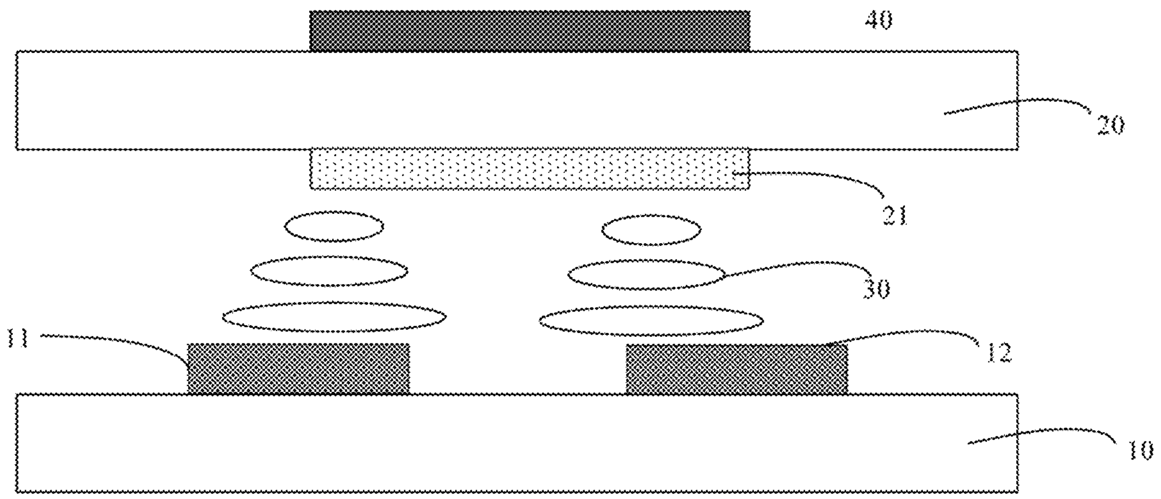
FIG. 2 is a cross-sectional view of a phase shifter according to an embodiment of the present disclosure.

FIG. 1 is a top view of a phase shifter according to an embodiment of the present disclosure; and FIG. 2 is a cross-sectional view of a phase shifter according to an embodiment of the present disclosure. In a first aspect, as shown in FIGS. 1 and 2, an embodiment of the present disclosure provides a phase shifter which adopts a phase shifting structure with a non-coplanar waveguide and in which a split ring resonator 40 is integrated to serve as a filter for filtering a radio frequency signal. Specifically, the phase shifter includes a first dielectric substrate 10 (FIG. 2), a second dielectric substrate 20, a first conductive pattern 11, a second conductive pattern 12, a third conductive pattern 21 (FIG. 2), a liquid crystal layer 30 (FIG. 2), and a plurality of split ring resonators 40. The first dielectric substrate 10 and the second dielectric substrate 20 are arranged opposite to each other, and the liquid crystal layer 30 is located between the first dielectric substrate 10 and the second dielectric substrate 20. The first conductive pattern 11 and the second conductive pattern 12 are arranged in a same layer and each on a side of the first dielectric substrate 10 close to the liquid crystal layer 30. The third conductive pattern 21 is arranged on a side of the second dielectric substrate 20 close to the first dielectric substrate 10. The third conductive pattern 21 includes a main structure 211, and a plurality of first branches 212 and a plurality of second branches 213 connected to the main structure 211 on two sides of an extending direction of the main structure 211, respectively, as shown in FIG. 1. Orthographic projections of the first branch 212 and the first conductive pattern 11 on the first dielectric substrate 10 partially overlap each other, and orthographic projections of the second branch 213 and the second conductive pattern 12 on the first dielectric substrate 10 partially overlap each other. The split ring resonators 40 are arranged on a side of the second dielectric substrate 20 away from the third conductive pattern 21, and an orthographic projection of each split ring resonator 40 on the first dielectric substrate 10 at least partially overlaps an orthographic projection of the third conductive pattern 21 on the first dielectric substrate 10.

In the phase shifter according to the embodiment of the present disclosure, liquid crystal molecules in the liquid crystal layer 30 in the overlapping region between the first branch 212 and the first conductive pattern 11 and in the overlapping region between the second branch 213 and the second conductive pattern 12 are deflected, under a driving of an external voltage, so that the dielectric constant of the liquid crystal layer 30 is changed, and thus the phase shifting function is realized. At the same time, the split ring resonator 40 is arranged on the side of the second dielectric substrate 20 away from the third conductive pattern 21, to pass radio frequency signals in a desired frequency band and suppress unwanted radio frequency signals. The phase shifter according to the embodiment of the disclosure has both the phase shifting function and the filtering function, and can effectively solve the problems of large volume, low integration level and large loss of the existing microwave communication system caused by the separate and independent design of the phase shifter and the filter.

In some examples, in the third conductive pattern 21 of the phase shifter, the first branches 212 are arranged in one-to-one correspondence with the second branches 213. For the first branch 212 and second branch 213, which are correspondingly arranged, a region, where the orthographic projections of the first branch 212 and the first conductive pattern 11 on the first dielectric substrate 10 overlap each other, is a first region, a region, where the orthographic projections of the second branch 213 and the second conductive pattern 12 on the first dielectric substrate 10 overlap each other, is a second region, and an area of the first region is equal to an area of the second region.

Furthermore, the first branch 212 and the second branch 213, which are correspondingly arranged, have the same length and the same width. In the embodiment of the present disclosure, the widths of the respective first branches 212 and the respective second branches 213 are equal to each other.

Furthermore, in the embodiment of the present disclosure, in a direction from each of two ends of the main structure 211 of the third conductive pattern 21 toward a center of the main structure 211 of the third conductive pattern 21, an area of the region, where the orthographic projections of a respective first branch 212 and the first conductive pattern 11 on the first dielectric substrate 10 overlap each other, monotonically increases. For example, the widths of the respective first branches 212 are equal to each other, and the lengths of the respective first branches 212 monotonically increase in the direction from each of the two ends of the main structure 211 of the third conductive pattern 21 toward the center of the main structure 211 of the third conductive pattern 21. For another example, the lengths of the respective first branches 212 are equal to each other, and the widths of the respective first branches 212 monotonically increase in the direction from each of the two ends of the main structure 211 of the third conductive pattern 21 toward the center of the main structure 211 of the third conductive pattern 21. Similarly, in the direction from each of the two ends of the main structure 211 of the third conductive pattern 21 toward the center of the main structure 211 of the third conductive pattern 21, an area of the region, where the orthographic projections of a respective second branch 213 and the second conductive pattern 12 on the first dielectric substrate 10 overlap each other, monotonically increases. For example, the widths of the respective second branches 213 are equal to each other, and the lengths of the respective second branches 213 monotonically increase in the direction from each of the two ends of the main structure 211 of the third conductive pattern 21 toward the center of the main structure 211 of the third conductive pattern 21. For another example, the lengths of the respective second branches 213 are equal to each other, and the widths of the respective second branches 213 monotonically increase in the direction from each of the two ends of the main structure 211 of the third conductive pattern 21 toward the center of the main structure 211 of the third conductive pattern 21. The reason for such an arrangement is that an operational frequency band of the liquid crystal phase shifter can be effectively widened and a return loss is reduced, through adopting a periodic structure with gradual changing transverse branches.

In some examples, the lengths of the respective first branches 212 are equal to each other, and the widths of the respective first branches 212 are also equal to each other; the lengths of the respective second branches 213 are equal to each other, and the widths of the respective second branches 213 are also equal to each other. Such a structure is easy to form, and handy to control.

In some examples, spacings between any two adjacent first branches 212 are equal to each other, and spacings between any two adjacent second branches 213 are equal to each other. Alternatively, the spacing between the first branches 212 may vary periodically, and the spacing between the second branches 213 may vary periodically.

In some examples, the main structure 211, the first branch 212, and the second branch 213 of the third conductive pattern 21 are formed into a one-piece structure, that is, the three components may be formed in one patterning process. The one-piece structure is simple in structure and easy to be implemented.

In some examples, the split ring resonators 40 in the embodiment of the present disclosure are sequentially arranged along the extending direction of the third conductive pattern 21, each split ring resonator 40 includes an outer ring 42 and an inner ring 41 nested in the outer ring 42, and positions of splits of the inner ring 41 and the outer ring 42 are opposite to each other, as shown in FIG. 1, which can effectively improve the magnetic permeability.

In some examples, the split ring resonator 40 in the embodiment of the present disclosure may be a square split ring resonator 40, or may be a circular split ring resonator 40.

In order to make the phase shifter in the embodiment of the present disclosure clearer, the phase shifter in the embodiment of the present disclosure is described below with reference to specific examples. The first branch 212 in the third conductive pattern 21 in the phase shifter has a same size (i.e. a same length and a same width) as that of a second branch 213 corresponding to the first branch 212. The widths of the respective first branches 212 are equal to each other, and the length of the respective first branch 212 increases monotonically along the direction from each of the two ends of the main structure 211 toward the center of the main structure 211. The widths of the respective second branches 213 are equal to each other, and the length of the respective second branch 213 monotonically increases in the direction from each of the two ends of the main structure 211 toward the center of the main structure 211.

A first example is as follows. Referring to FIGS. 1 and 2, the first dielectric substrate 10 and the second dielectric substrate 20 in the phase shifter are each a glass substrate with a thickness of 0.3 mm, a thickness of the liquid crystal layer 30 is 8.6 μm, and thicknesses of the third conductive pattern 21, the first conductive pattern 11, the second conductive pattern 12 and the split ring resonator 40 are each 2 μm. The split ring resonators in this example employ square split ring resonators 40, the number of square split ring resonators 40 in FIG. 1 is five, and the five split ring resonators 40 have the same size. Any two adjacent split ring resonators 40 are staggered, and an orthographic projection of a split of the inner ring 41 of one of the two adjacent split ring resonators 40 on the first dielectric substrate 10 is within an orthographic projection of the main structure 211 on the first dielectric substrate 10, and an orthographic projection of a split of the outer ring 42 of the other one of the two adjacent split ring resonators 40 on the first dielectric substrate 10 is within an orthographic projection of the main structure 211 on the first dielectric substrate 10. For example, the orthographic projection of the split of the inner ring 41 of one of the two adjacent split ring resonators 40 on the first dielectric substrate 10 is within an orthographic projection of a center line of the main structure 211 on the first dielectric substrate 10, and the orthographic projection of the split of the outer ring 42 of the other one of the two adjacent split ring resonators 40 on the first dielectric substrate 10 is within the orthographic projection of the center line of the main structure 211 on the first dielectric substrate 10. It should be noted that the center line of the main structure 211 is a straight line that passes through the center of the main structure 211 and extends along the extending direction of the main structure 211.

Figure 3:
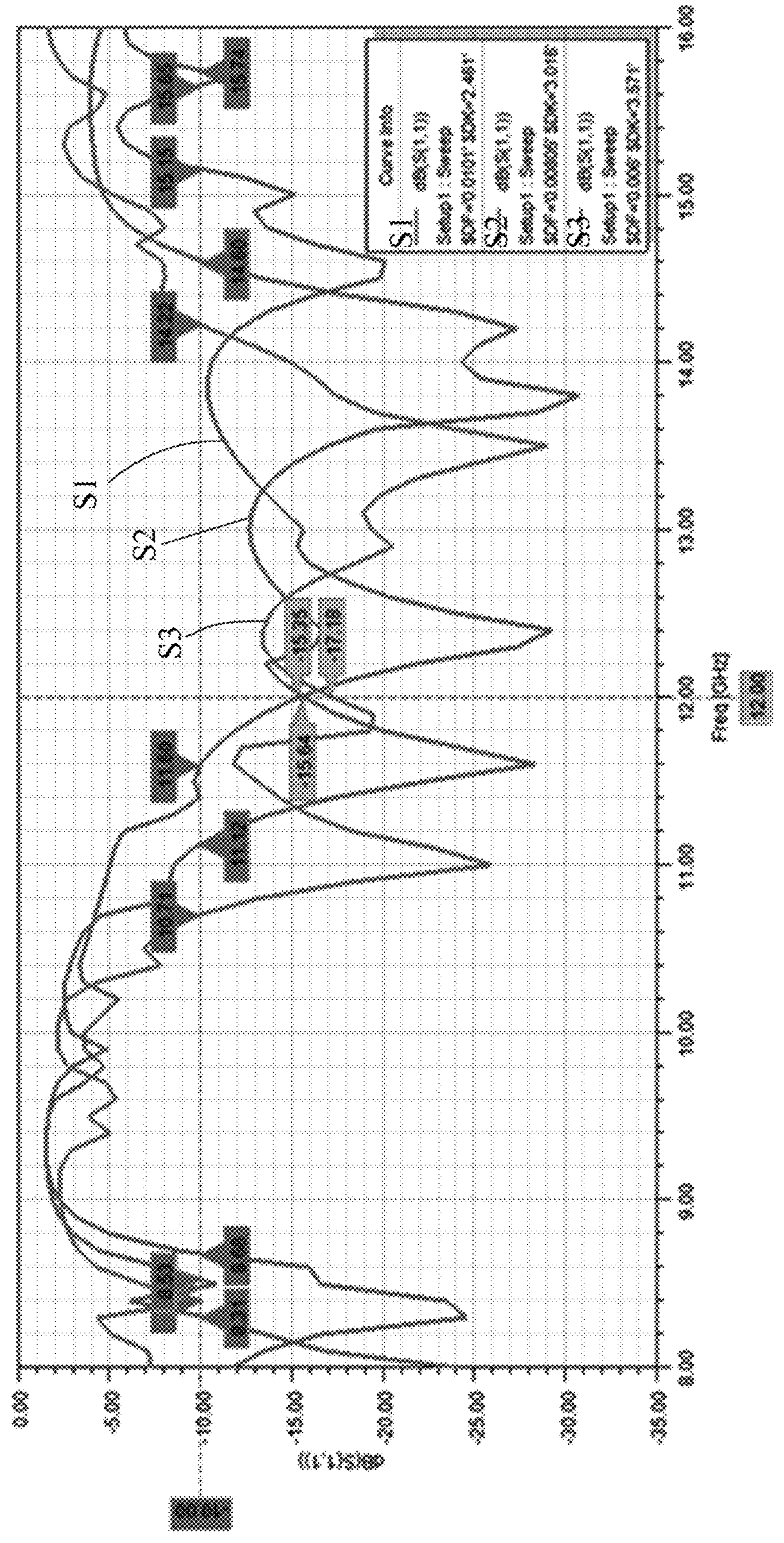
FIG. 3 shows a S11 curve of a phase shifter in a first example of an embodiment of the present disclosure.
Figure 4:
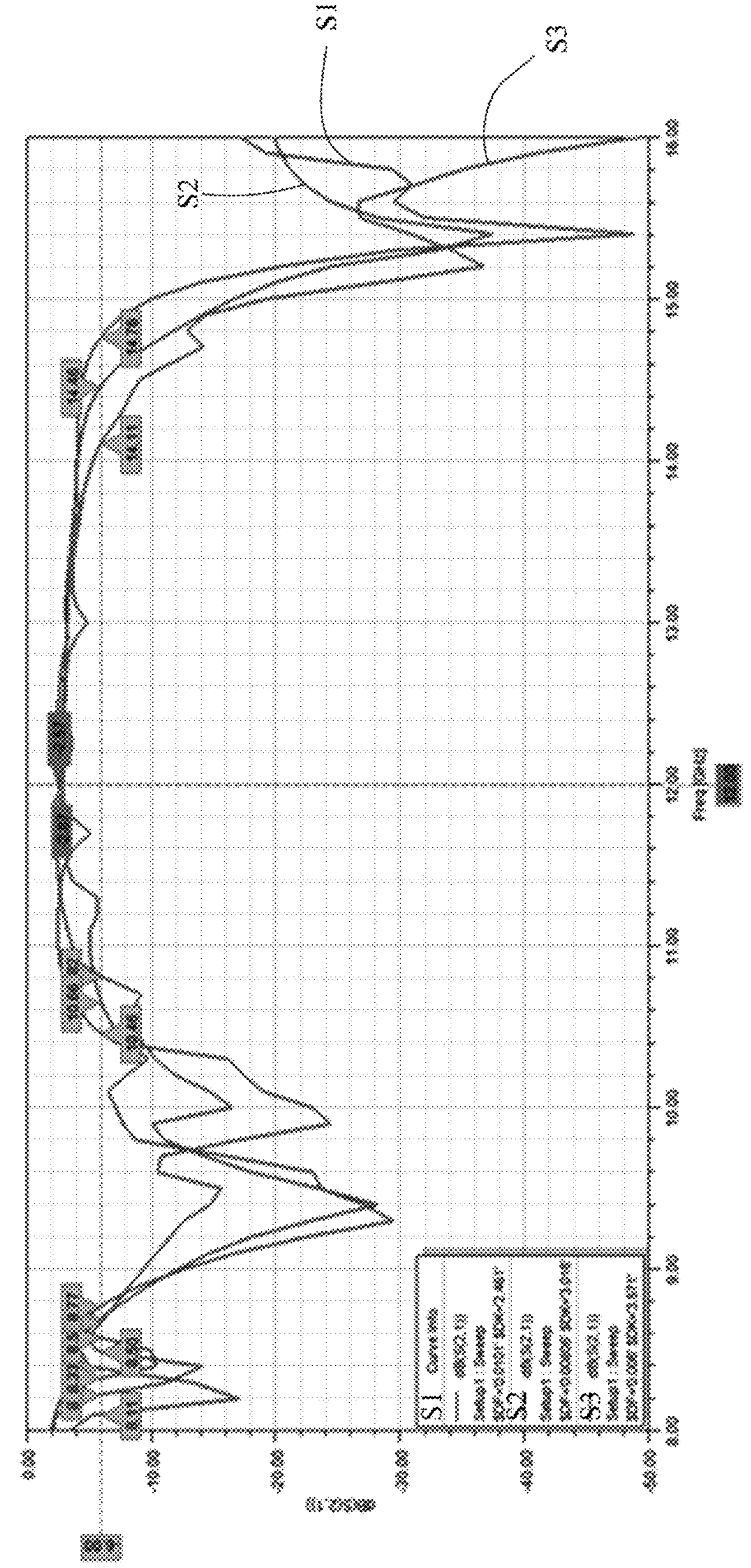
FIG. 4 shows a S12 curve of a phase shifter in a first example of an embodiment of the present disclosure.
Figure 5:
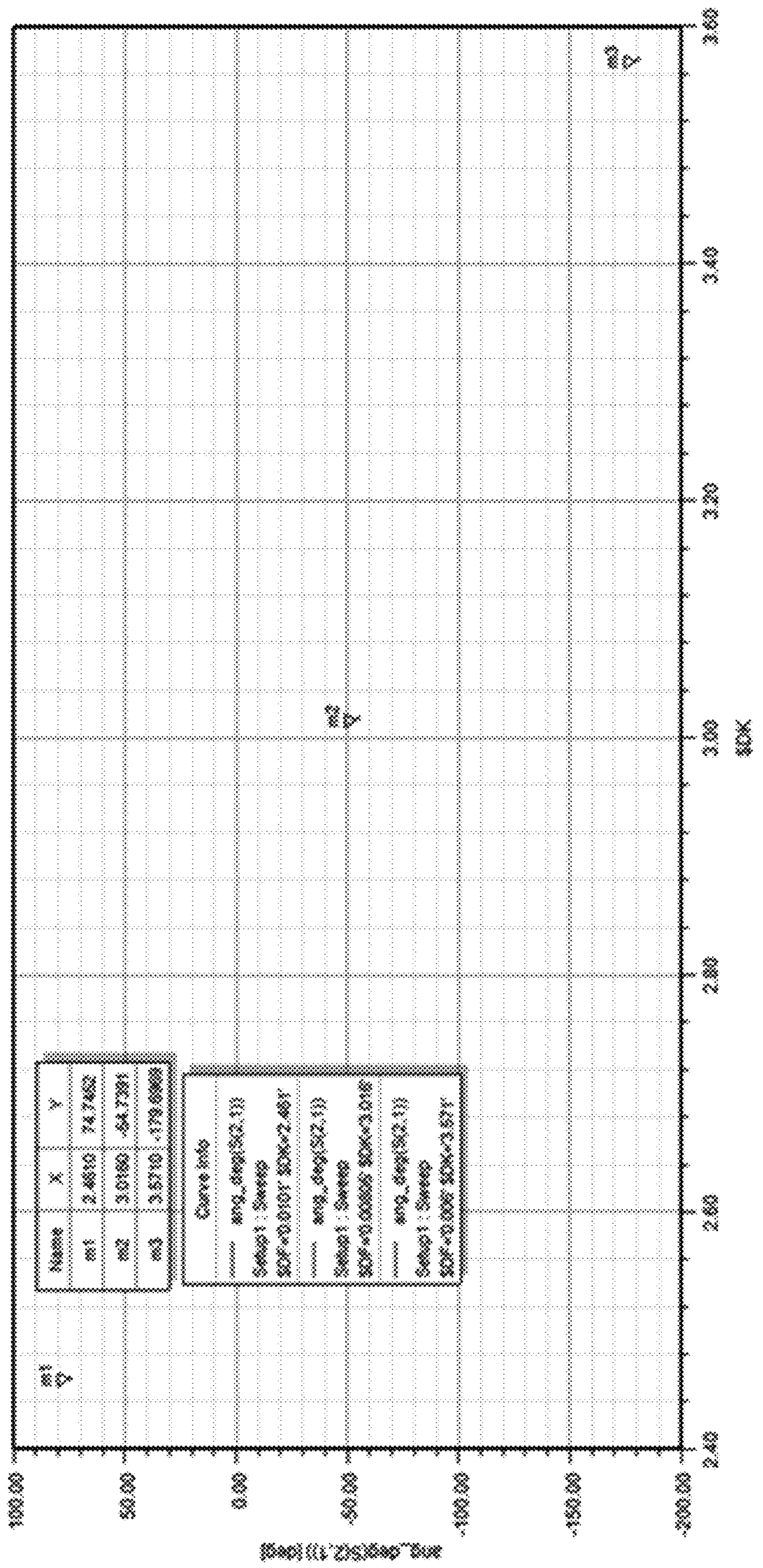
FIG. 5 shows a phase shift curve of a phase shifter in a first example of an embodiment of the present disclosure.

In order to make the performance of the phase shifter shown in FIG. 1 clearer, the phase shifter shown in FIG. 1 is simulated. FIG. 3 shows a S11 curve of the phase shifter in the first example of the embodiment of the present disclosure; FIG. 4 shows a S12 curve of the phase shifter in the first example of the embodiment of the present disclosure; and FIG. 5 shows a phase shift curve of the phase shifter in the first example of the embodiment of the present disclosure. Referring to FIGS. 3 to 5, it can be seen that S11 (FIG. 3) of the liquid crystal phase shifter in a frequency band from 11.60 GHz to 14.22 GHz is less than −10 dB, and insertion loss in a frequency band from 11.60 GHz to 14.11 GHz is less than 6 dB, thereby producing effective band-pass filtering effect, S12 at an operational frequency point of 12 GHz is 2.87 dB, and an amount of phase shift is 254.4° as shown in FIG. 5. Although the insertion loss is less than 6 dB in the frequency band from 10.82 GHz to 14.11 GHz, a range of an effective band-pass filtering is narrower due to that the −10 dB impedance bandwidth is narrower in this arrangement.

Figure 6:
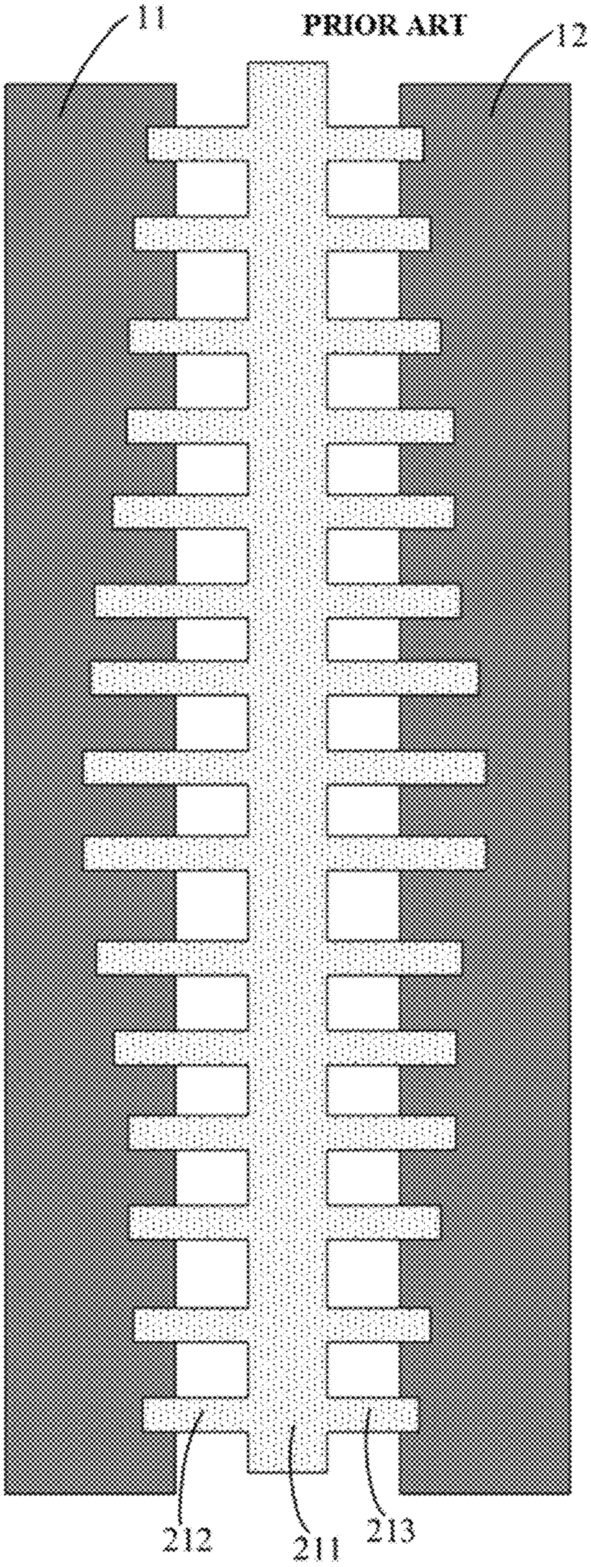
FIG. 6 is a top view of a phase shifter without a split ring resonator.
Figure 7:
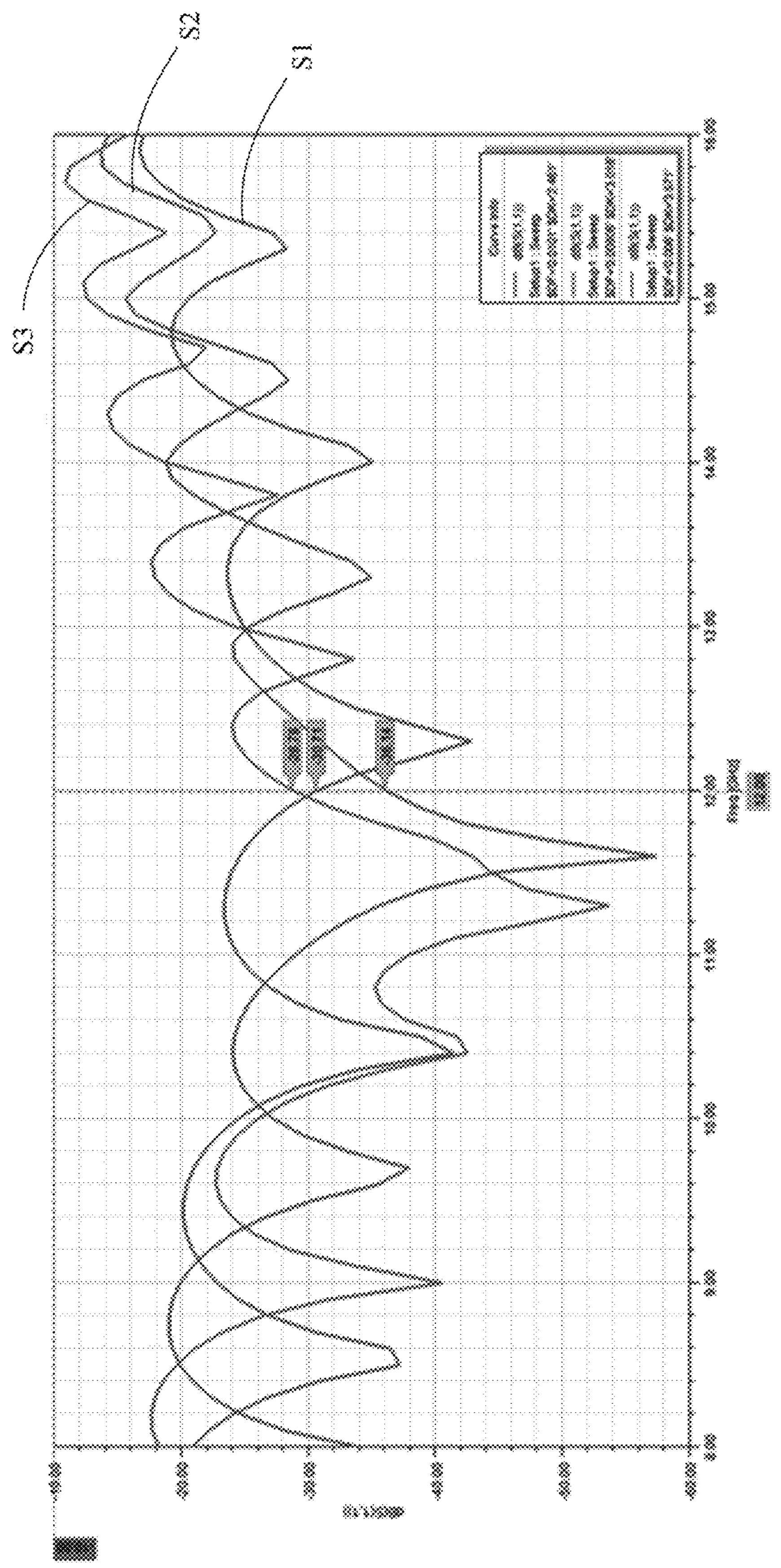
FIG. 7 shows a S11 curve of the phase shifter shown in FIG. 6.
Figure 8:
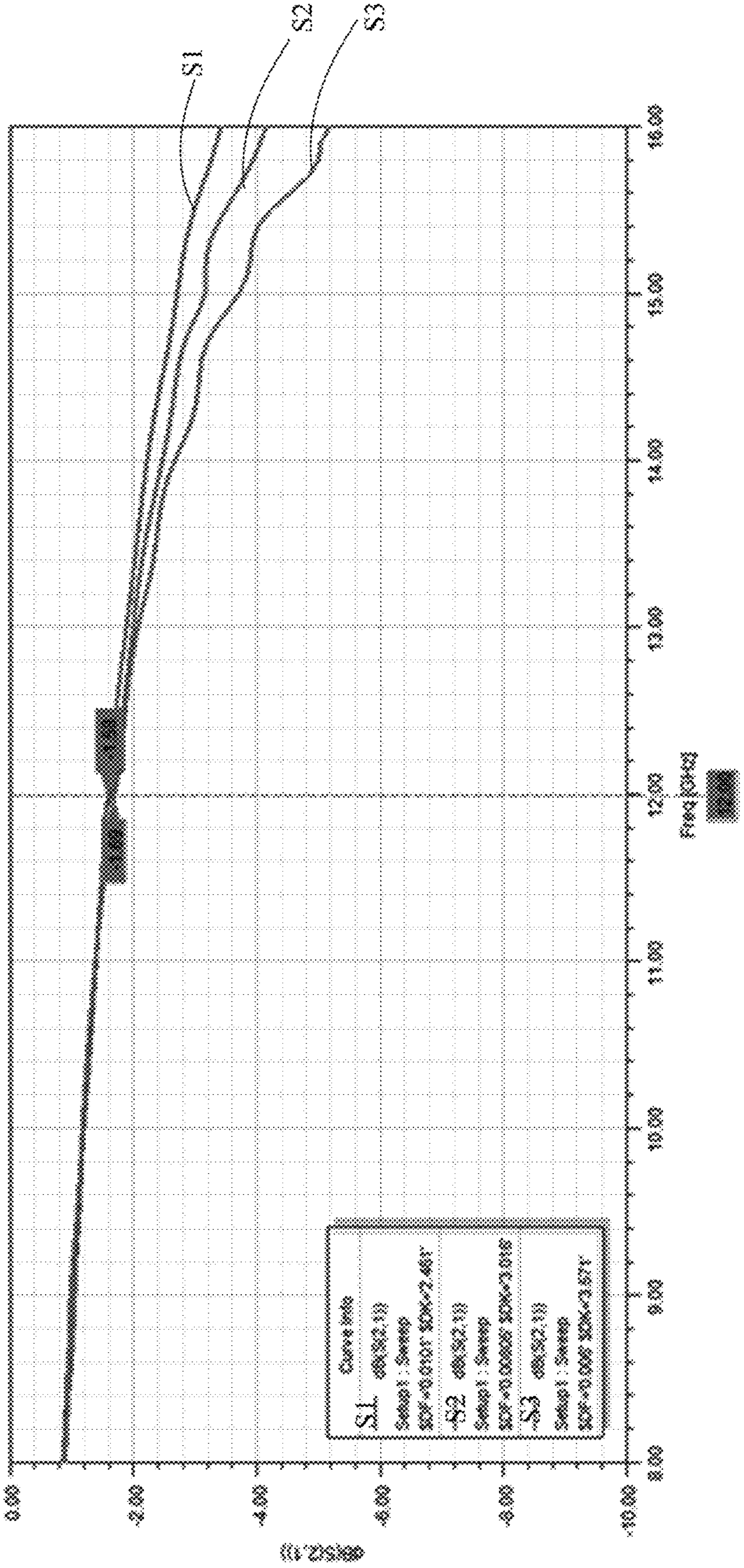
FIG. 8 shows a S12 curve of the phase shifter shown in FIG. 6.
Figure 9:
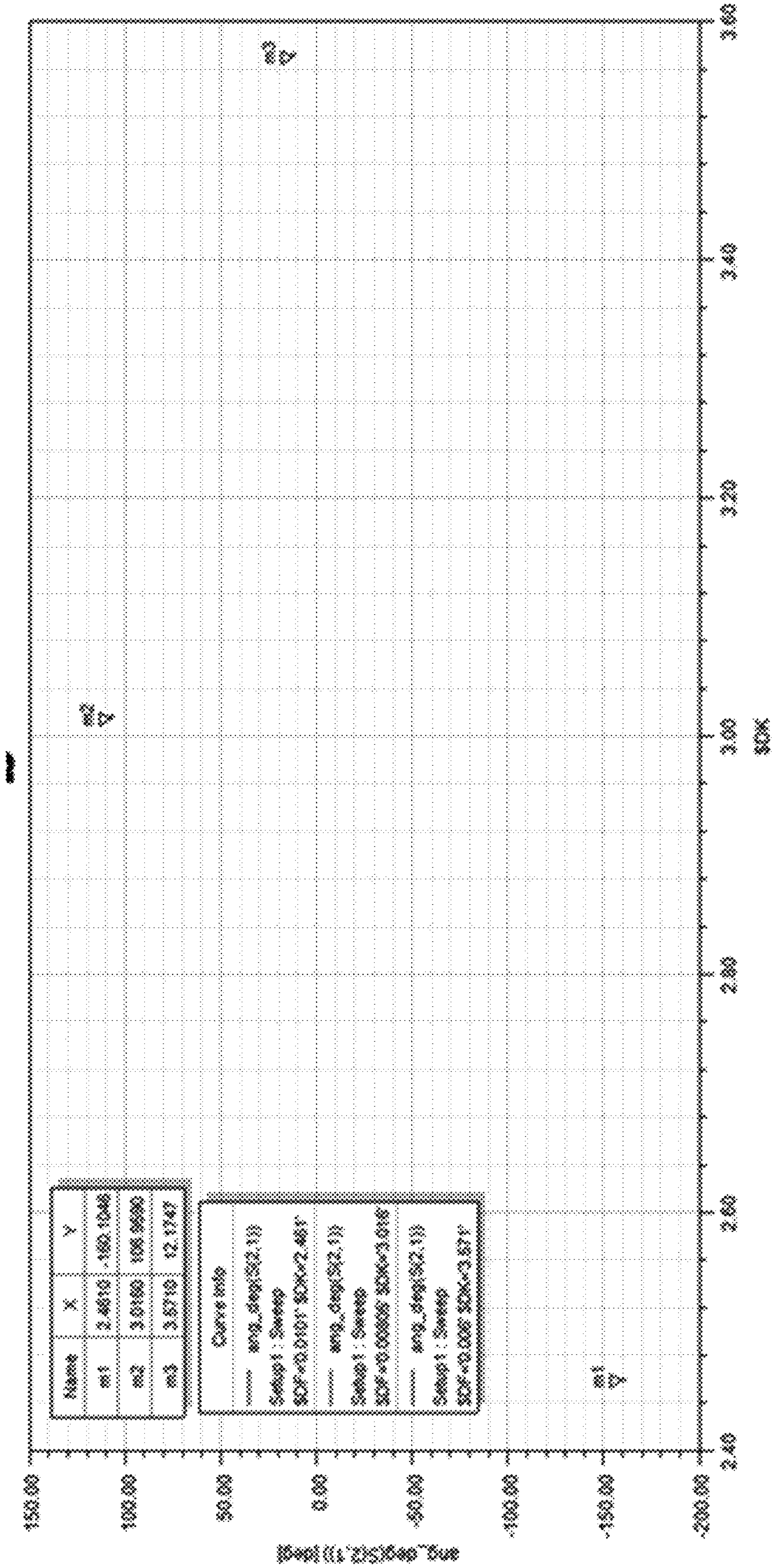
FIG. 9 shows a phase shift curve of the phase shifter shown in FIG. 6.

FIG. 6 is a top view of a phase shifter without a split ring resonator. As shown in FIG. 6, this phase shifter is not provided with the split ring resonator 40 compared with the phase shifter shown in FIG. 1. The phase shifter shown in FIG. 6 is simulated. FIG. 7 shows a S11 curve of the phase shifter in FIG. 6; FIG. 8 shows a S12 curve of the phase shifter shown in FIG. 6; and FIG. 9 shows a phase shift curve of the phase shifter shown in FIG. 6. As shown in FIGS. 7 to 9, it can be seen that S11 (FIG. 7) of the liquid crystal phase shifter in a frequency band from 8.0 GHz to 16.0 GHz is less than −10 dB, S12 at the operational frequency point of 12 GHz is 1.69 dB, and the amount of phase shift is 172.3° as shown in FIG. 9. Compared with the phase shifter shown in FIG. 1, the upper surface of the upper glass in this embodiment has no split ring resonator 40, therefore, the phase shifter has no band-pass filter characteristic, and has only a phase shifting characteristic.

Figure 10:
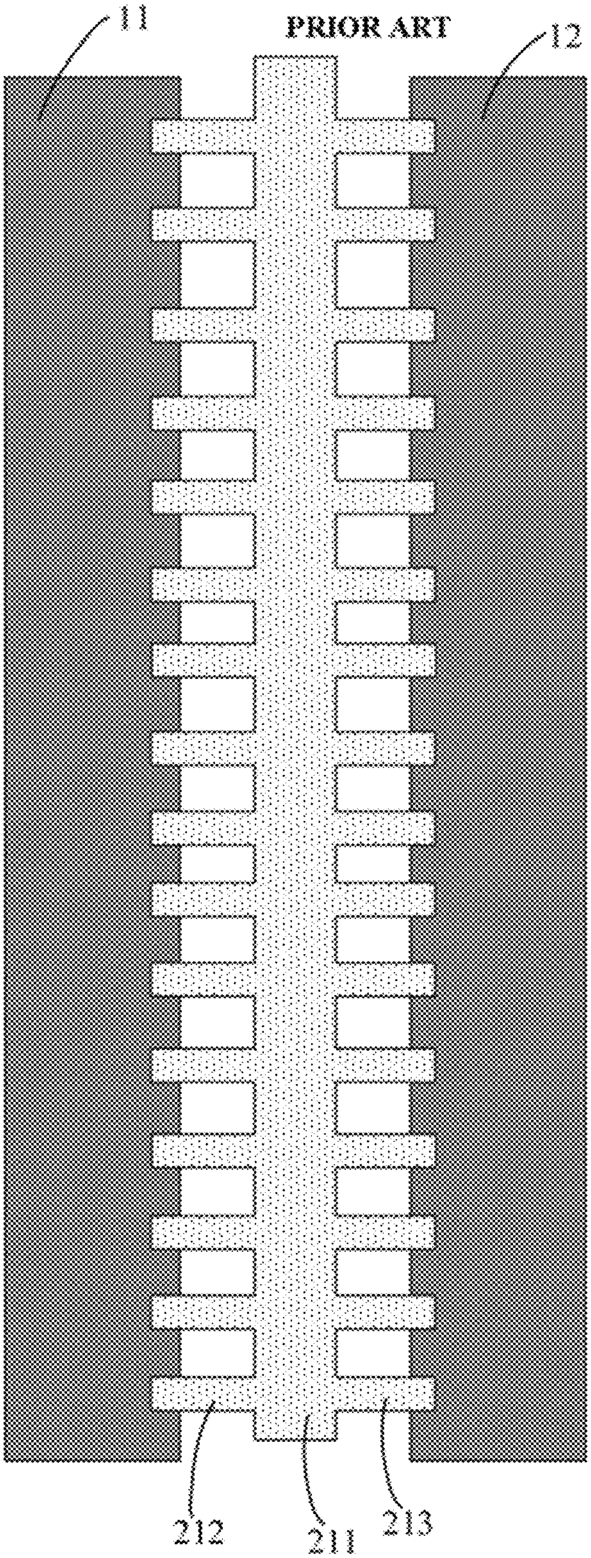
FIG. 10 is a top view of another phase shifter without a split ring resonator.
Figure 11:
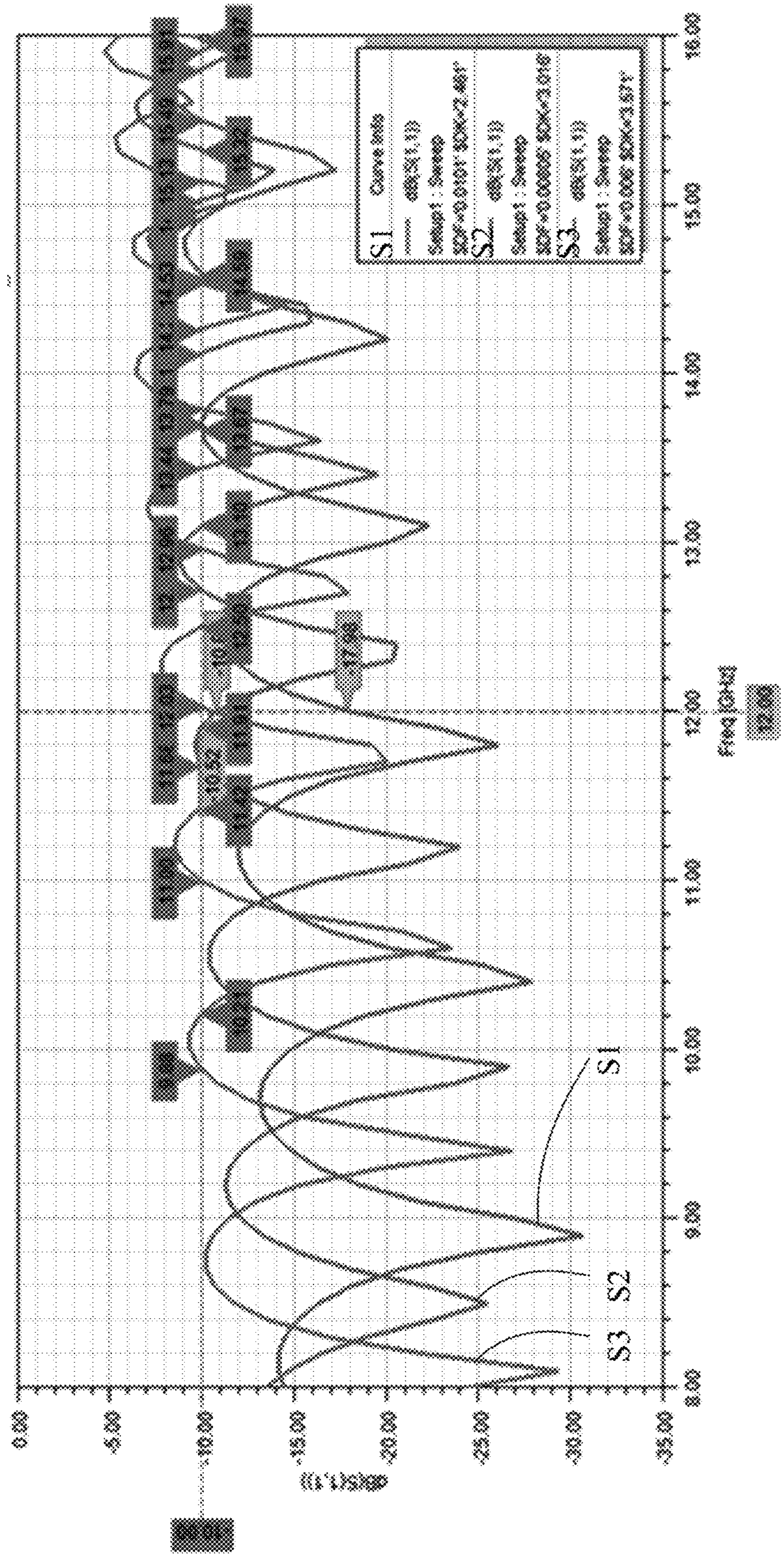
FIG. 11 shows a S11 curve of the phase shifter shown in FIG. 10.
Figure 12:
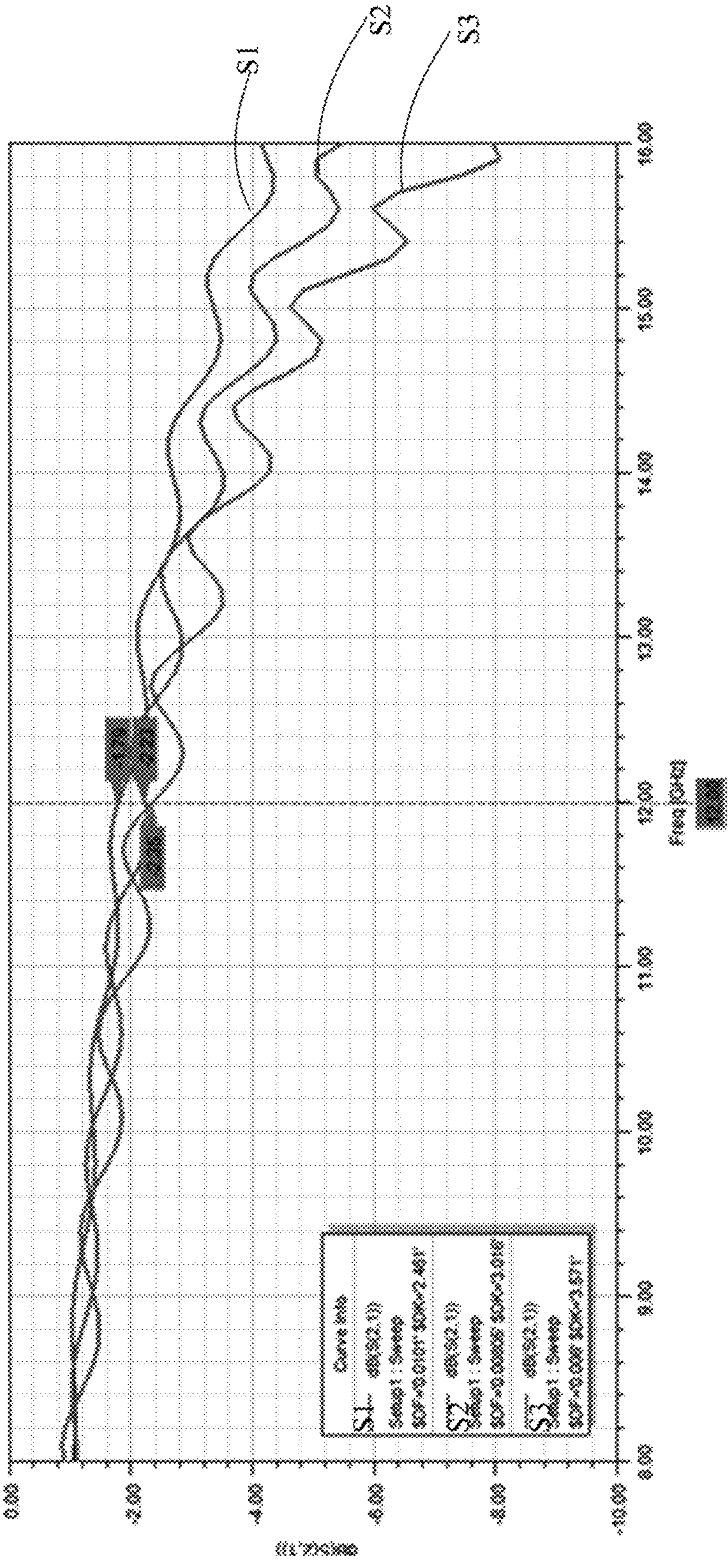
FIG. 12 shows a S12 curve of the phase shifter shown in FIG. 10.
Figure 13:
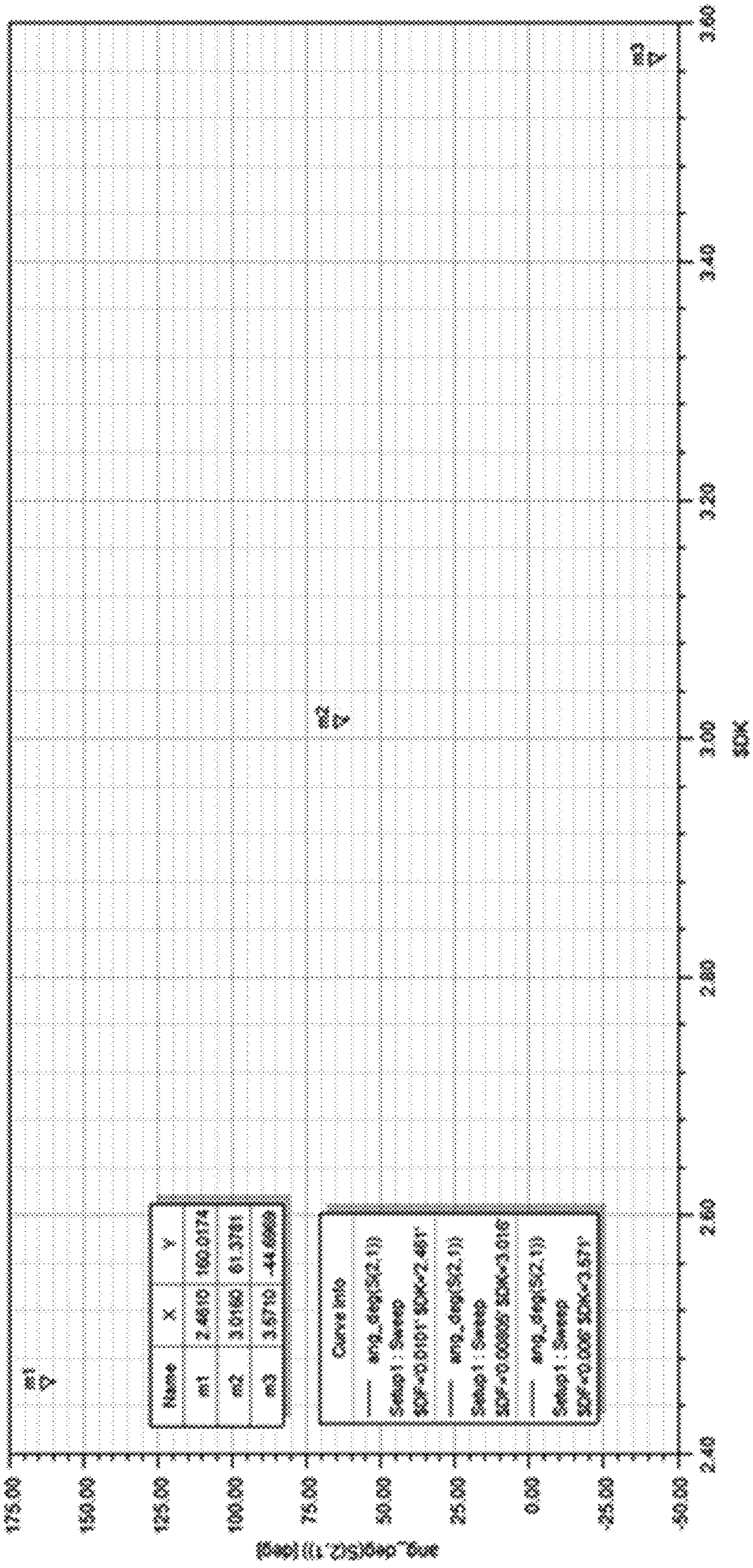
FIG. 13 shows a phase shift curve of the phase shifter shown in FIG. 10.

FIG. 10 is a top view of another phase shifter without a split ring resonator. As shown in FIG. 10, the respective first branches 212 and the respective second branches 213 of the phase shifter have the same size, and the phase shifter has no split ring resonator 40. The phase shifter shown in FIG. 10 is simulated. FIG. 11 shows a S11 curve of the phase shifter in FIG. 10; FIG. 12 shows a S12 curve of the phase shifter in FIG. 10; and FIG. 13 shows a phase shift curve of the phase shifter shown in FIG. 10. As shown in FIGS. 11 to 13, it can be seen that S11 of the liquid crystal phase shifter at some frequency points in the frequency band from 8.0 GHz to 16.0 GHz is greater than −10 dB, S12 at the operational frequency point of 12 GHz is 2.35 dB, and the amount of phase shift is 204.7° as shown in FIG. 13. Compared with FIG. 6, in this embodiment, the central conductive strip of the non-coplane waveguide does not adopt the periodic structure with gradual changing transverse branches, which is not beneficial for the transition from a longitudinal electric field of the non-coplane waveguide to a transverse electric field at the central conductive strip, and therefore, the bandwidth of the liquid crystal phase shifter is relatively narrow.

Figure 14:
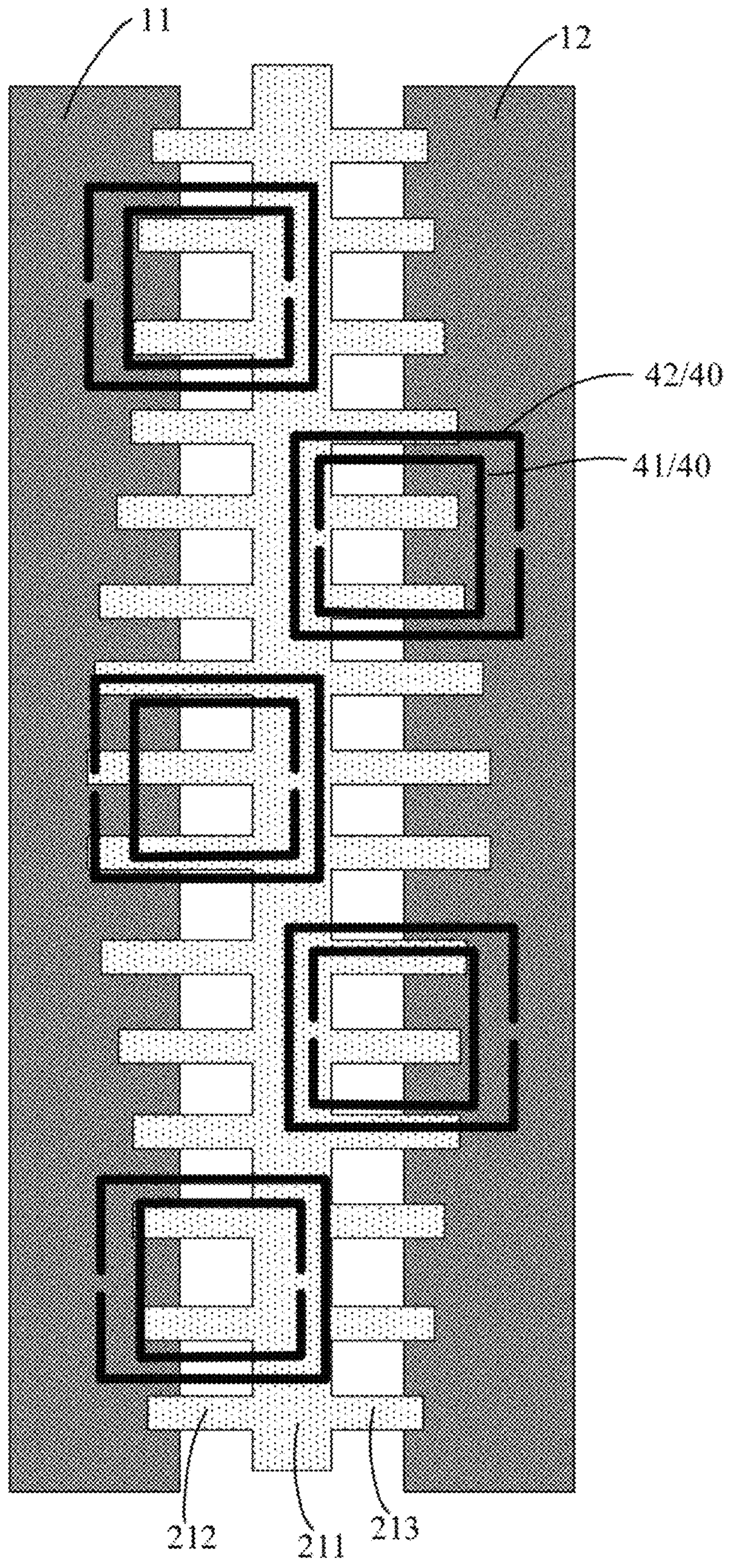
FIG. 14 is a top view of a phase shifter in a second example of an embodiment of the present disclosure.

A second example is as follows. FIG. 14 is a top view of the phase shifter in the second example of the embodiment of the present disclosure. As shown in FIG. 14, this example is substantially the same in structure as the first example, except that in this example, each of the orthographic projections of the splits of the inner rings 41 of the respective split ring resonators on the first dielectric substrate 10 (as shown in FIG. 2) is within the orthographic projection of the main structure 211 on the first dielectric substrate 10. For example, each of the orthographic projections of the splits of the inner rings 41 of the respective split ring resonators on the first dielectric substrate 10 is within the orthographic projection of the central line of the main structure 211 on the first dielectric substrate 10.

Figure 15:
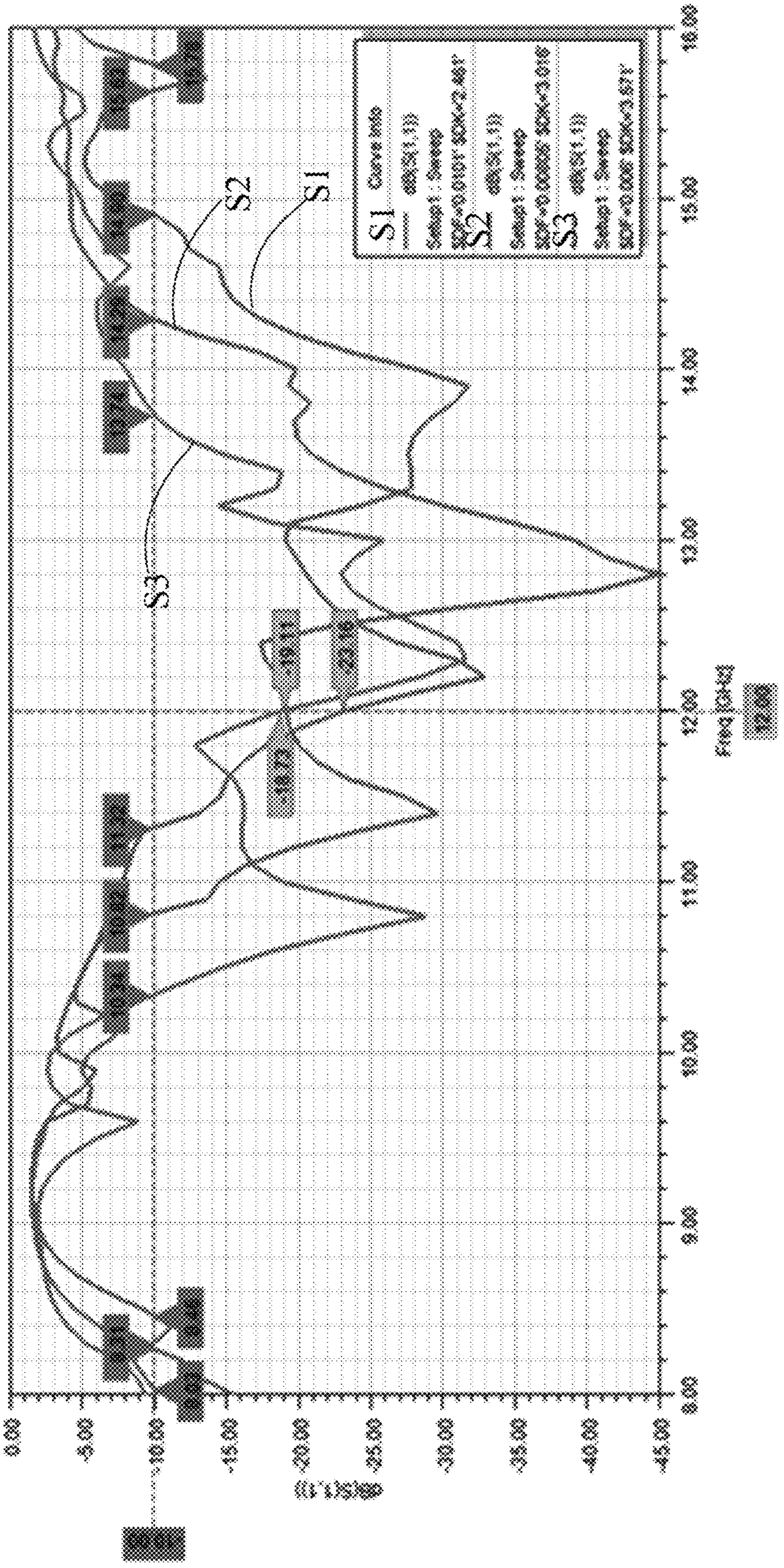
FIG. 15 shows a S11 curve of a phase shifter in a second example of an embodiment of the present disclosure.
Figure 16:
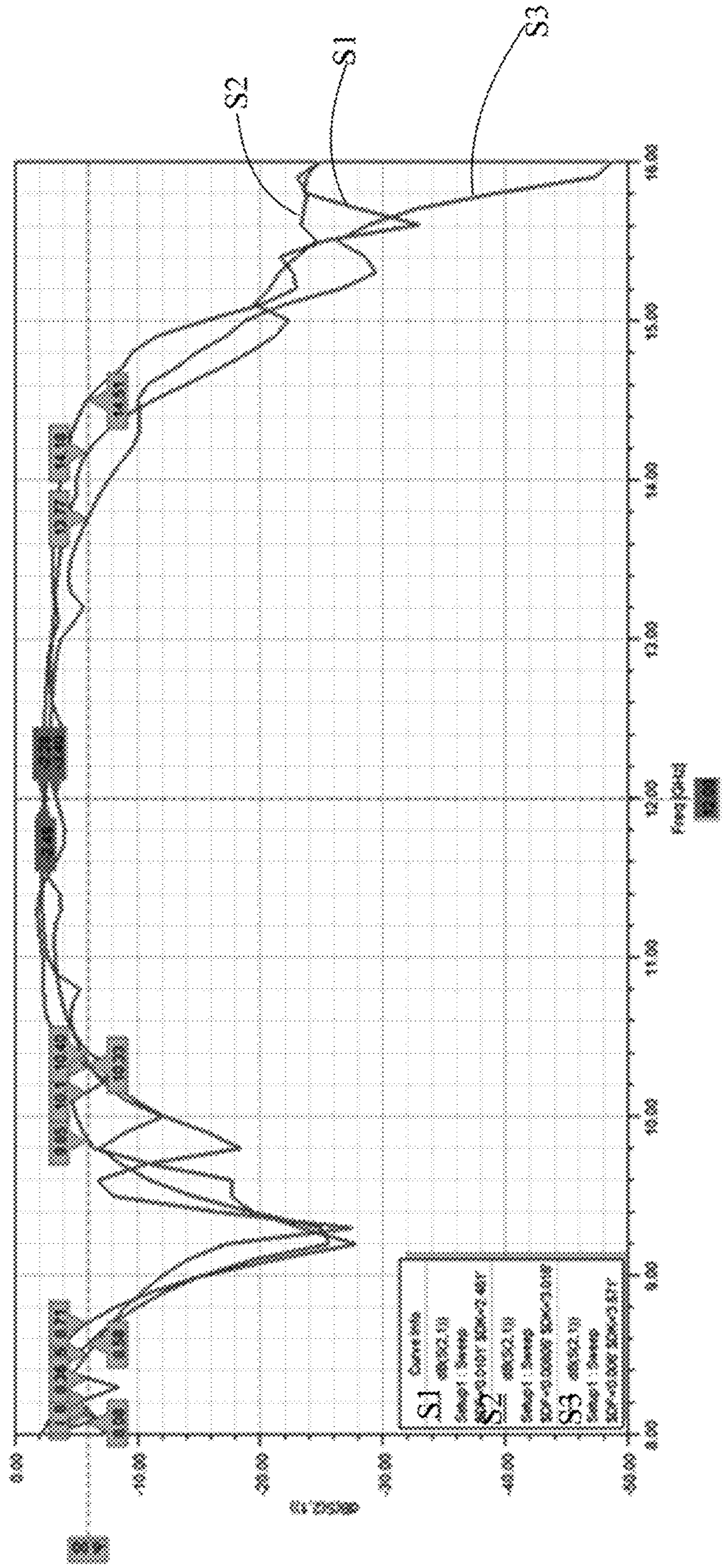
FIG. 16 shows a S12 curve of a phase shifter in a second example of an embodiment of the present disclosure.
Figure 17:
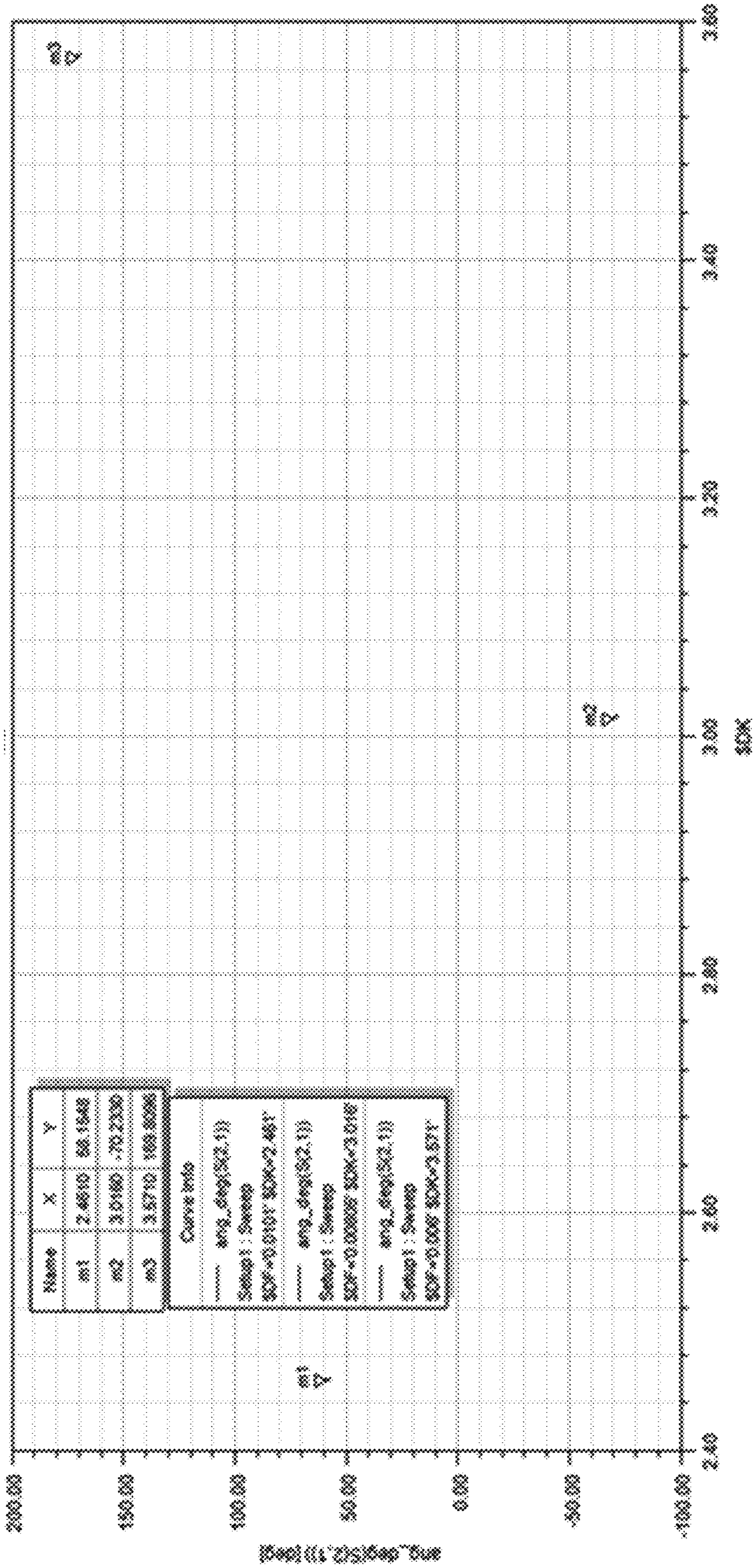
FIG. 17 shows a phase shift curve of a phase shifter in a second example of an embodiment of the present disclosure.

In order to make the performance of the phase shifter shown in FIG. 14 clearer, the phase shifter shown in FIG. 14 is simulated. FIG. 15 shows a S11 curve of the phase shifter in the second example of the embodiment of the present disclosure; FIG. 16 shows a S12 curve of the phase shifter in the second example of the embodiment of the present disclosure; and FIG. 17 shows a phase shift curve of the phase shifter in the second example of the embodiment of the present disclosure. As shown in FIGS. 15 to 17, it can be seen that S11 (FIG. 15) of the liquid crystal phase shifter in a frequency band from 11.32 GHz to 13.74 GHz is less than −10 dB, thereby producing effective band-pass filtering effect in the frequency band from 11.32 GHz to 13.74 GHz, S12 at the operational frequency point of 12 GHz is 3.40 dB, and the amount of phase shift is 248.3° as shown in FIG. 17. Compared with the phase shifter shown in the first example, each of the −10 dB impedance bandwidth and the amount of phase shift of the band-pass liquid crystal phase shifter corresponding to this embodiment is reduced. Although the insertion loss is less than 6 dB in the frequency band from 10.40 GHz to 13.77 GHZ, a range of an effective band-pass filtering is narrower due to that the −10 dB impedance bandwidth is narrower in this arrangement.

Figure 18:
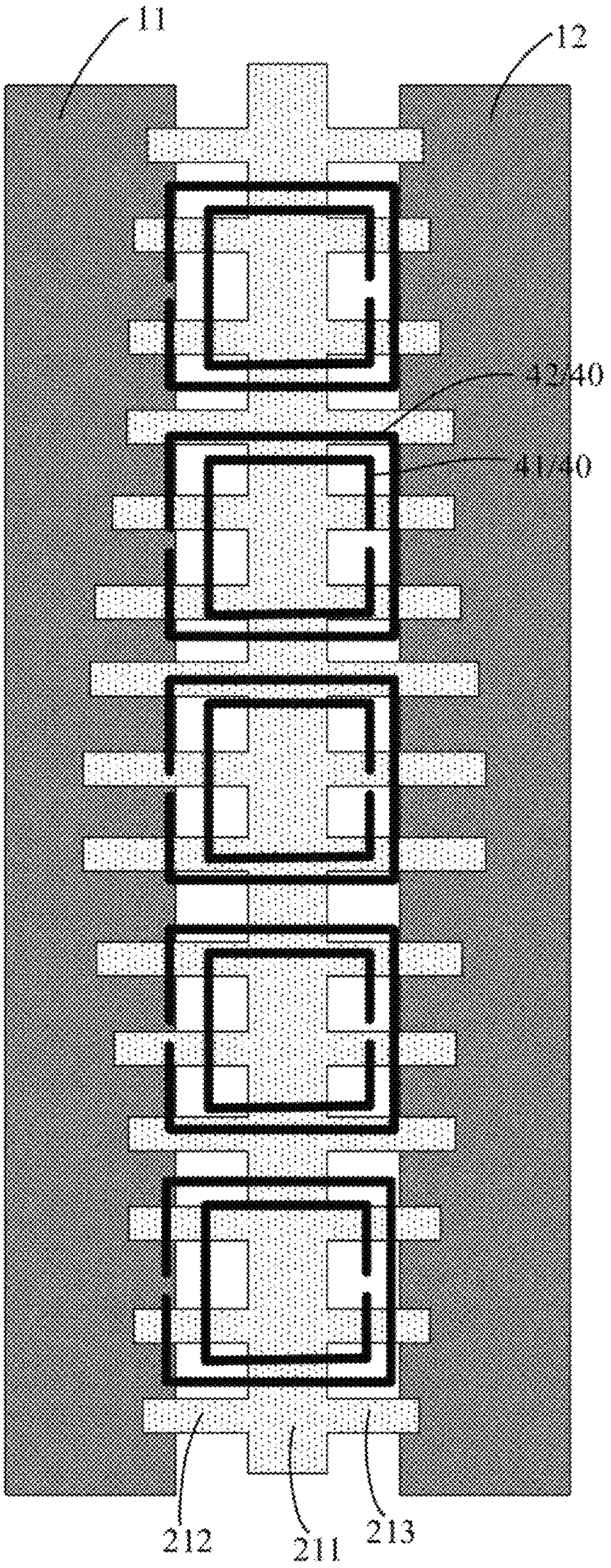
FIG. 18 is a top view of a phase shifter in a third example of an embodiment of the present disclosure.

A third example is as follows. FIG. 18 is a top view of the phase shifter in the third example of the embodiment of the present disclosure. As shown in FIG. 18, this example is substantially the same in structure as the first example, except that centers of the five square split ring resonators 40 are on a same straight line, and the orthographic projections of the centers of the respective split ring resonators 40 on the first dielectric substrate 10 (as shown in FIG. 2) are within the orthographic projection of the main structure 211 on the first dielectric substrate 10. For example, the orthographic projections of the centers of the respective split ring resonators 40 on the first dielectric substrate 10 are within the orthographic projection of the center line of the main structure 211 on the first dielectric substrate 10.

In some examples, orthographic projections of the split of the inner ring 41 and the split of the outer ring 42 of the respective split ring resonator 40 on the first dielectric substrate 10 are on two sides of the orthographic projection of the main structure 211 on the first dielectric substrate 10, respectively, and are each parallel to the extending direction of the main structure 211.

Figure 19:
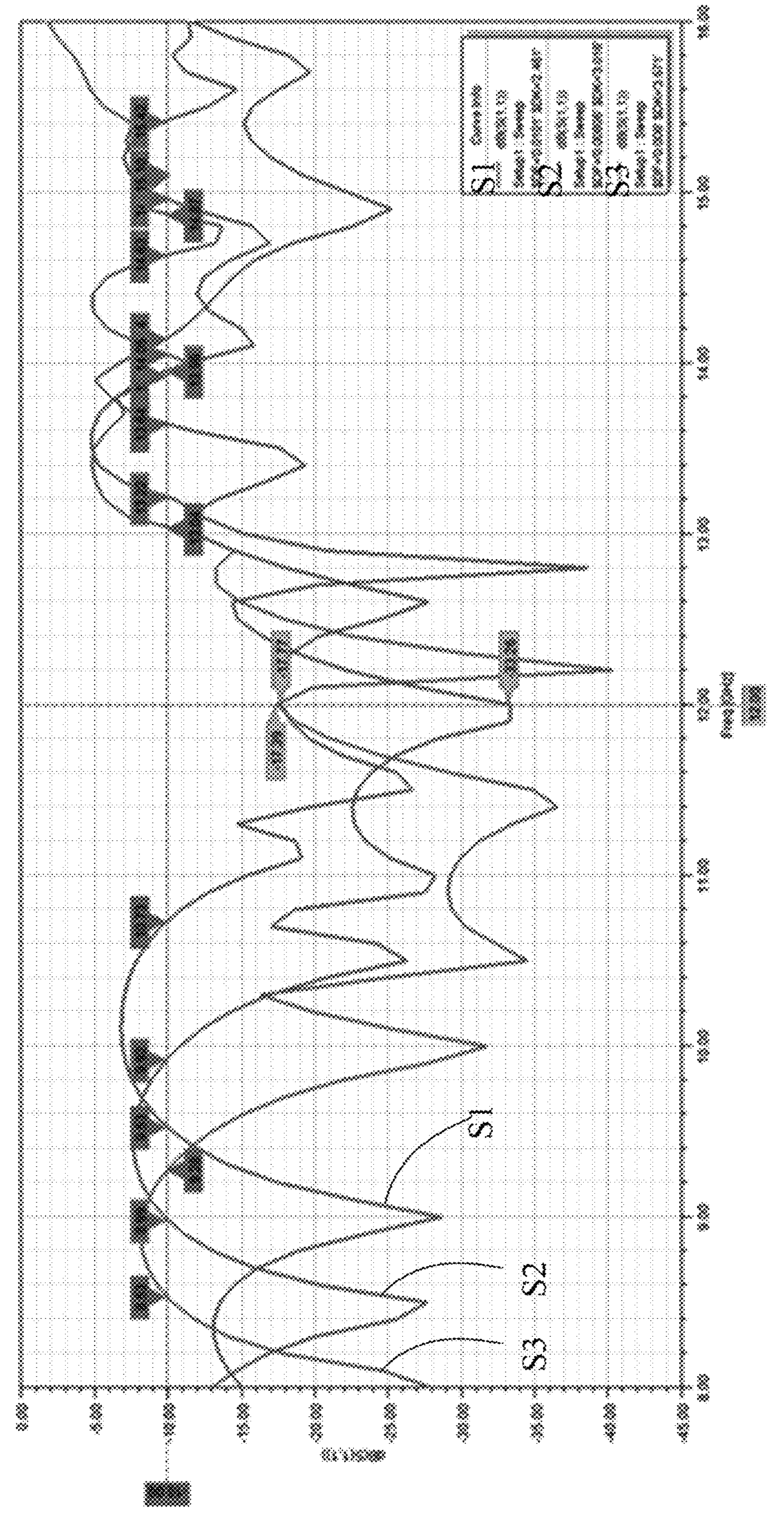
FIG. 19 shows a S11 curve of a phase shifter in a third example of an embodiment of the present disclosure.
Figure 20:
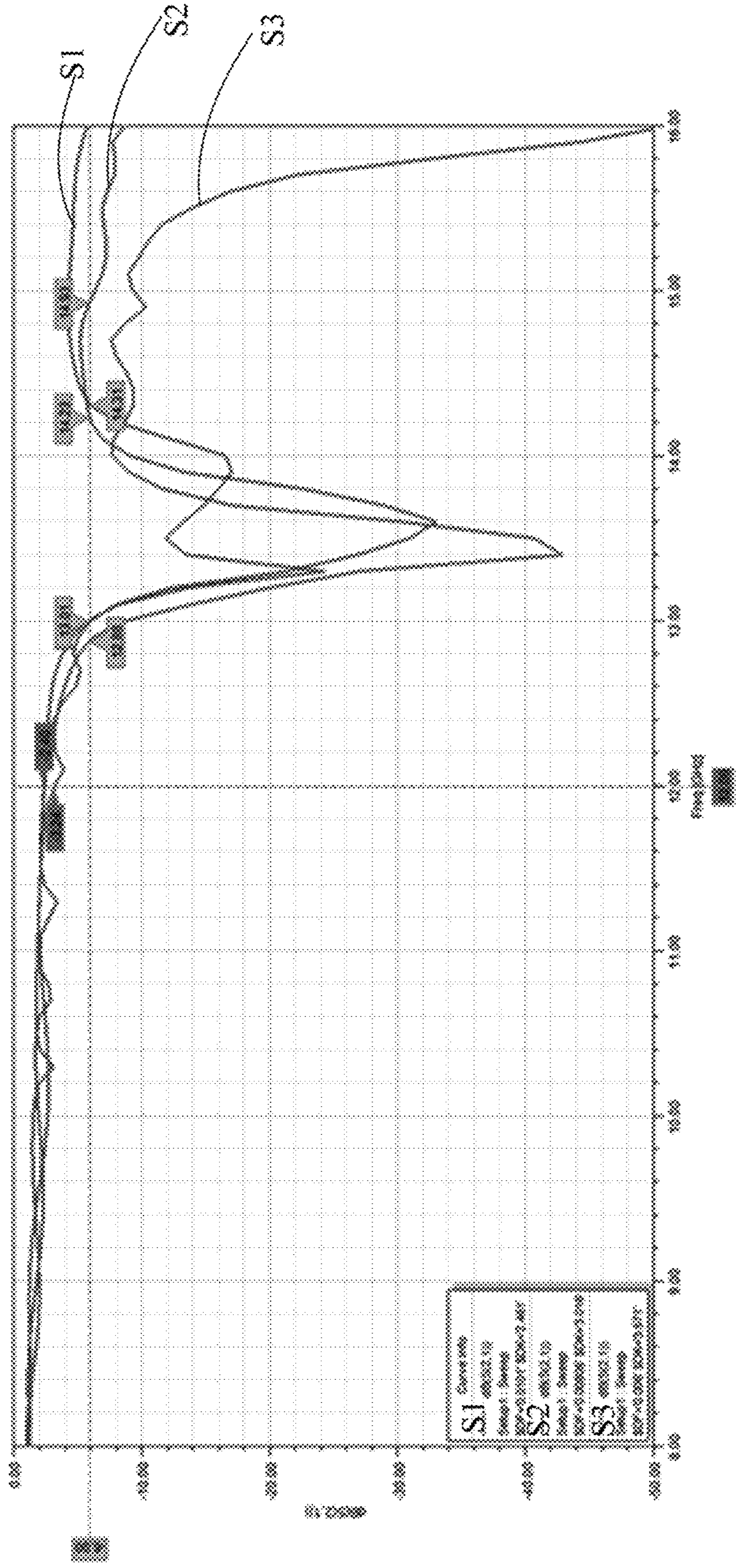
FIG. 20 shows a S12 curve of a phase shifter in a third example of an embodiment of the present disclosure.
Figure 21:
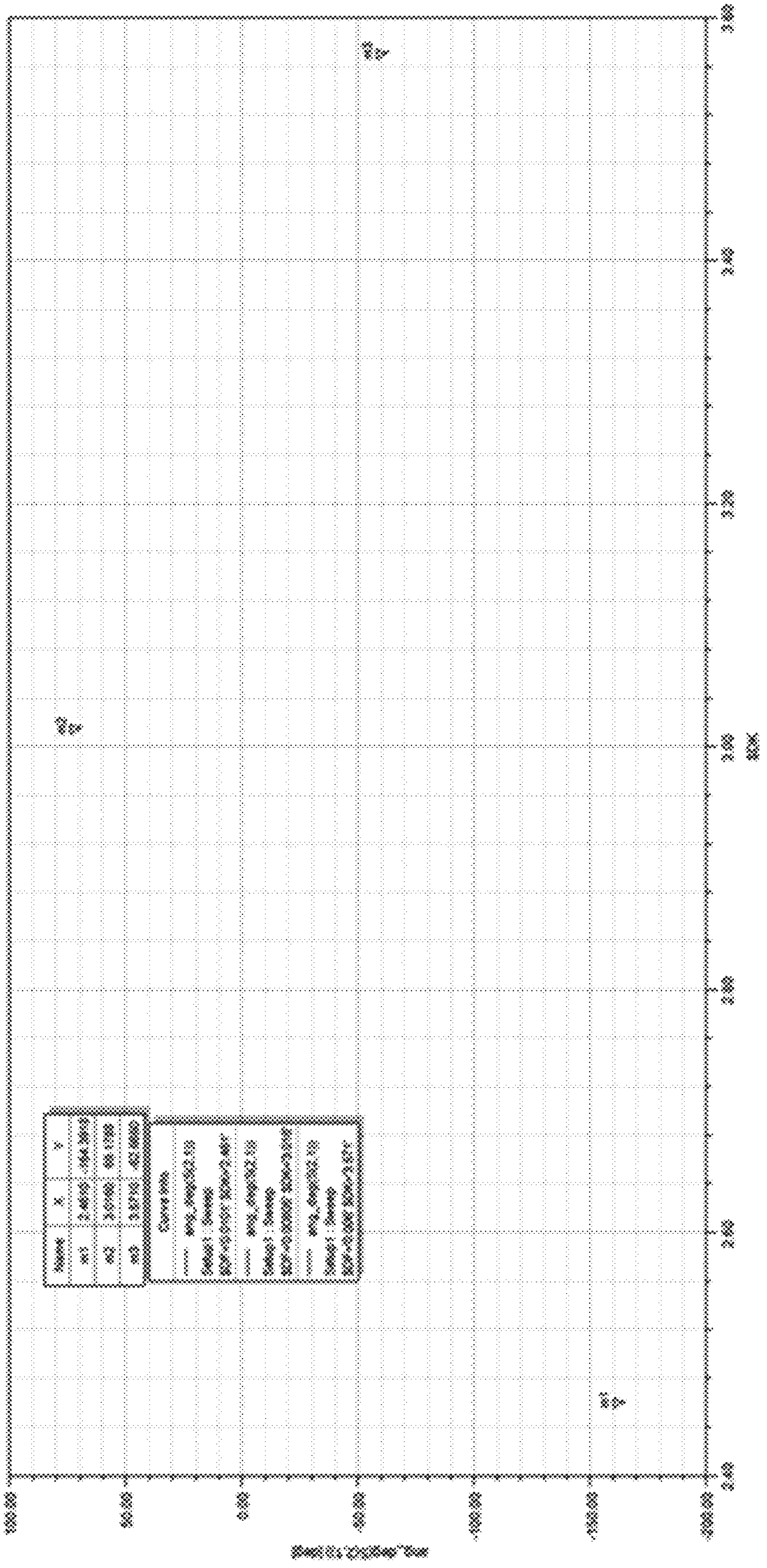
FIG. 21 shows a phase shift curve of a phase shifter in a third example of an embodiment of the present disclosure.

In order to make the performance of the phase shifter shown in FIG. 18 clearer, the phase shifter shown in FIG. 18 is simulated. FIG. 19 shows a S11 curve of the phase shifter in the third example of the embodiment of the present disclosure; FIG. 20 shows a S12 curve of the phase shifter in the third example of the embodiment of the present disclosure; and FIG. 21 shows a phase shift curve of the phase shifter in the third example of the embodiment of the present disclosure. As shown in FIGS. 19 to 21, it can be seen in FIG. 19 that S11 (FIG. 19) of the liquid crystal phase shifter in a frequency band from 10.73 GHz to 13.04 GHz is less than −10 dB, S12 at the operational frequency point of 12 GHz is 3.24 dB, and the amount of phase shift is 258.3° as shown in FIG. 21. With the arrangement of the split ring resonators in this example, an effective low pass filtering effect is produced in the frequency band from 8 GHz to 16 GHz.

Figure 22:
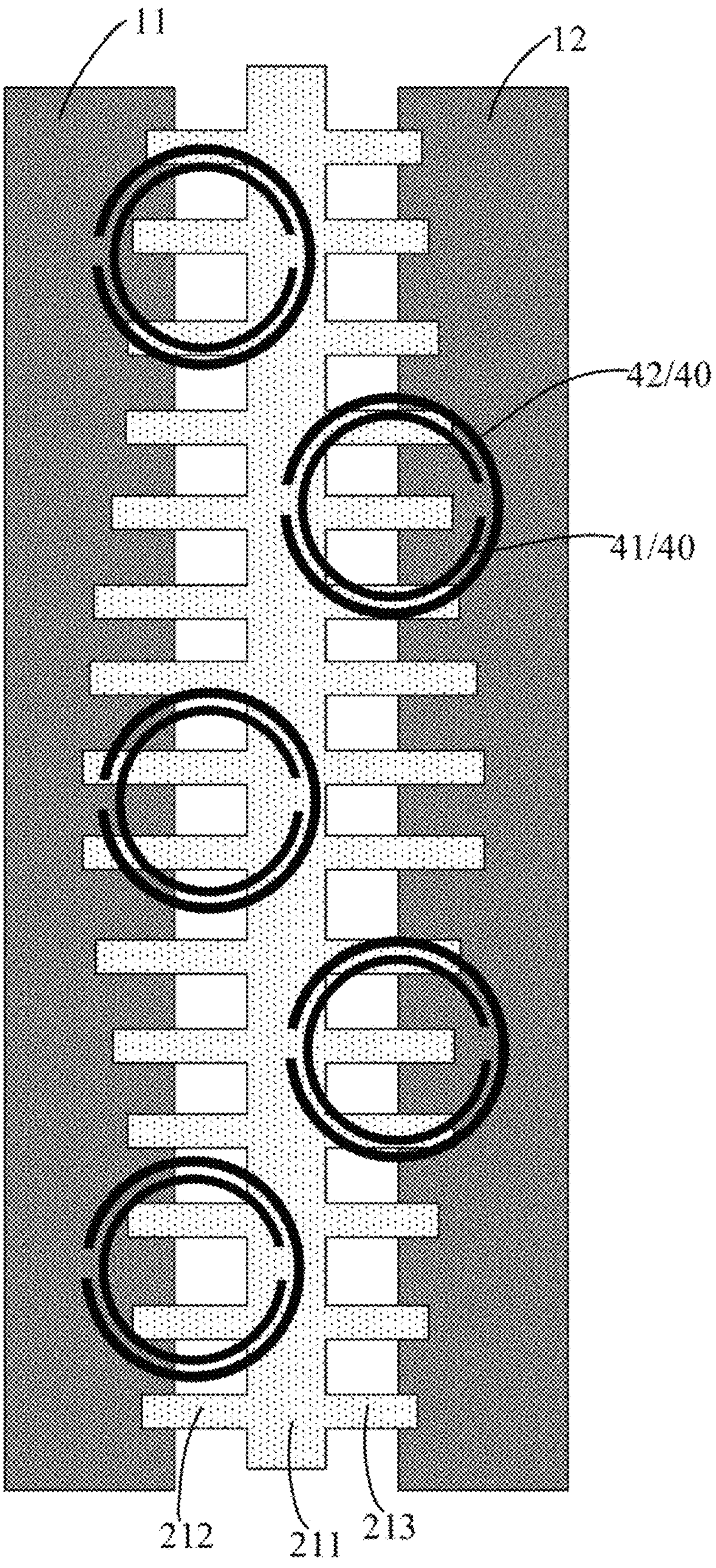
FIG. 22 is a top view of a phase shifter in a fourth example of an embodiment of the present disclosure.

A fourth example is as follows. FIG. 22 is a top view of the phase shifter in the fourth example of the embodiment of the present disclosure. As shown in FIG. 22, this example is substantially the same in structure as the first example, except that the split ring resonator 40 in this example is a circular split ring resonator 40. The rest of the structure is the same as that in the first example, and therefore, the description thereof is not repeated herein.

Figure 23:
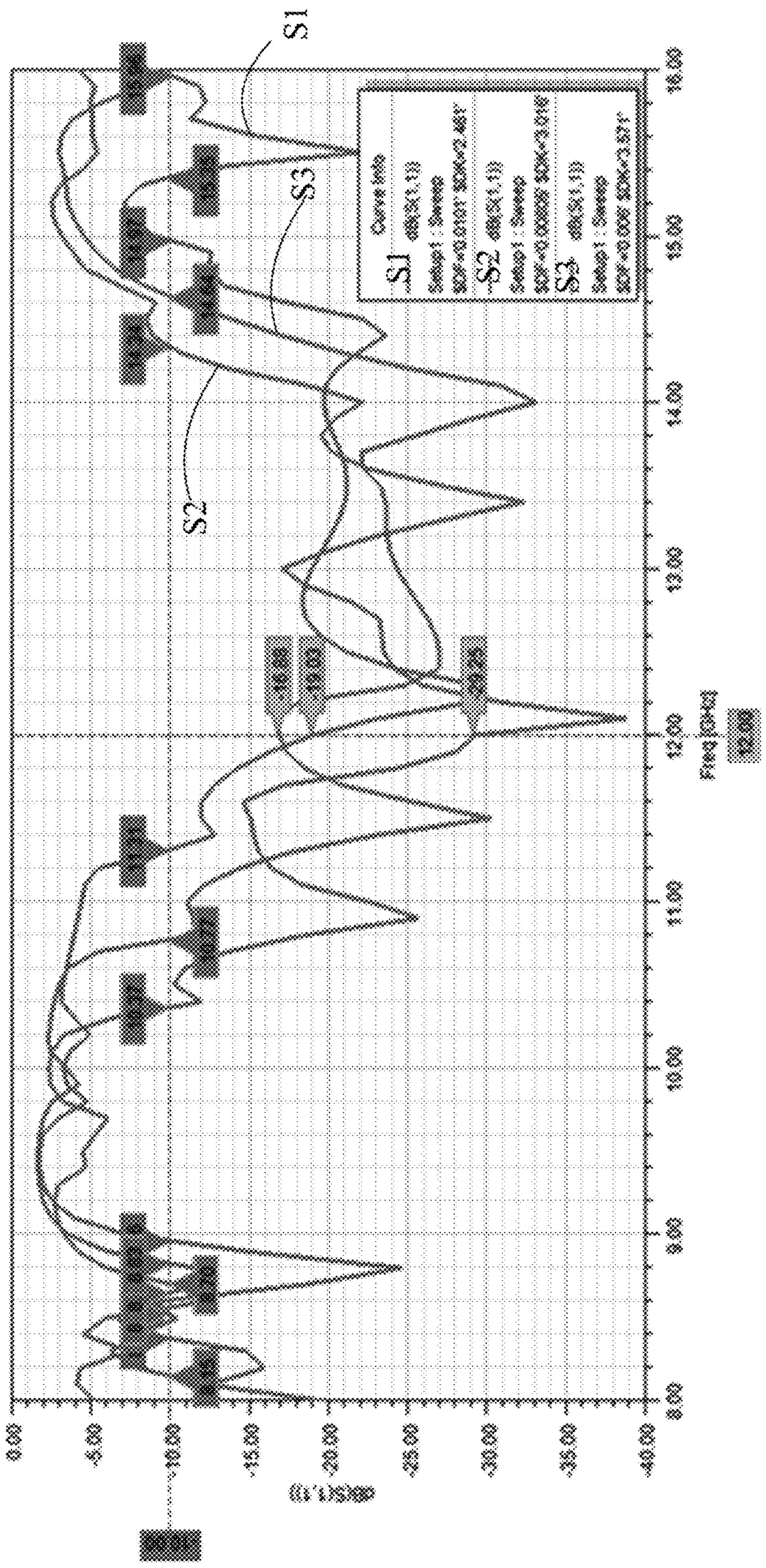
FIG. 23 shows a S11 curve of a phase shifter in a fourth example of an embodiment of the present disclosure.
Figure 24:
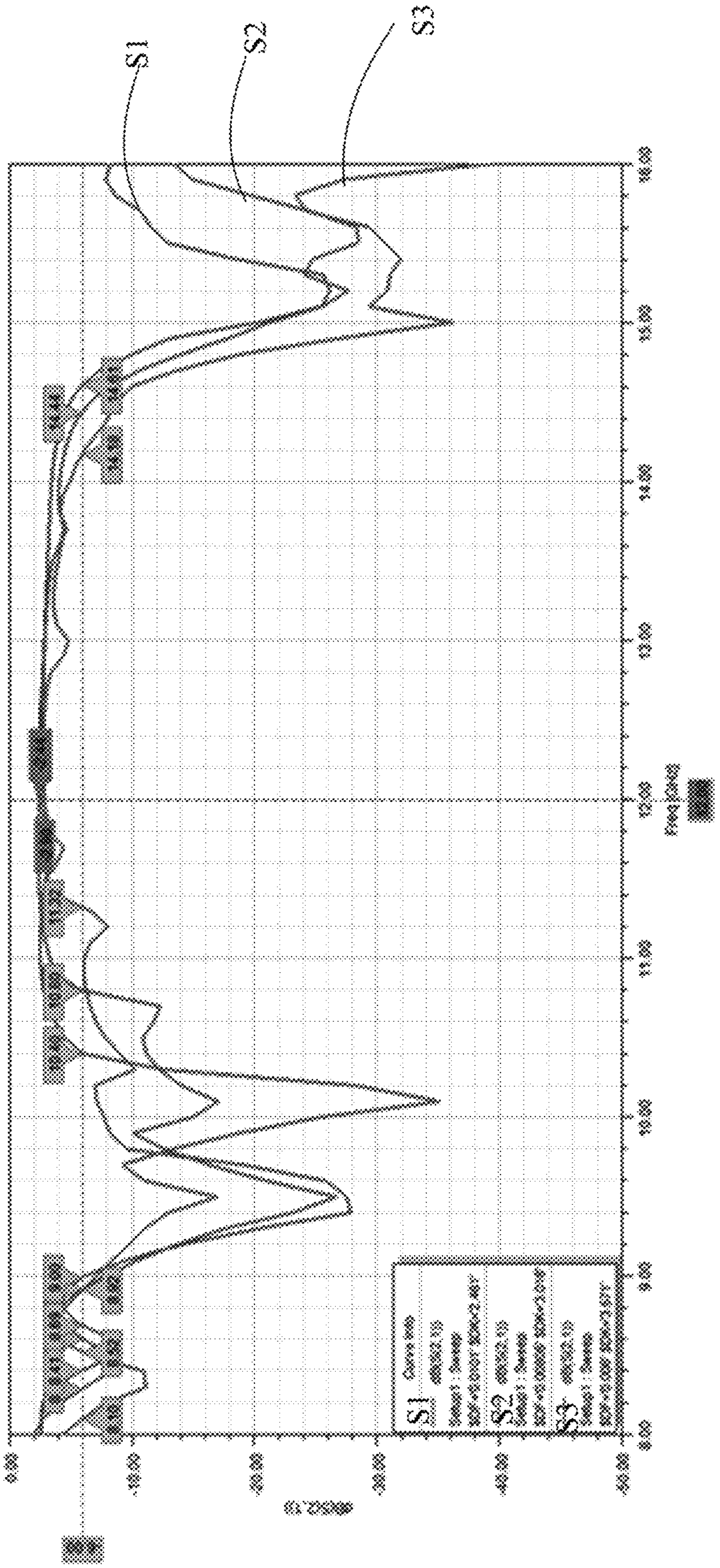
FIG. 24 shows a S12 curve of a phase shifter in a fourth example of an embodiment of the present disclosure.
Figure 25:
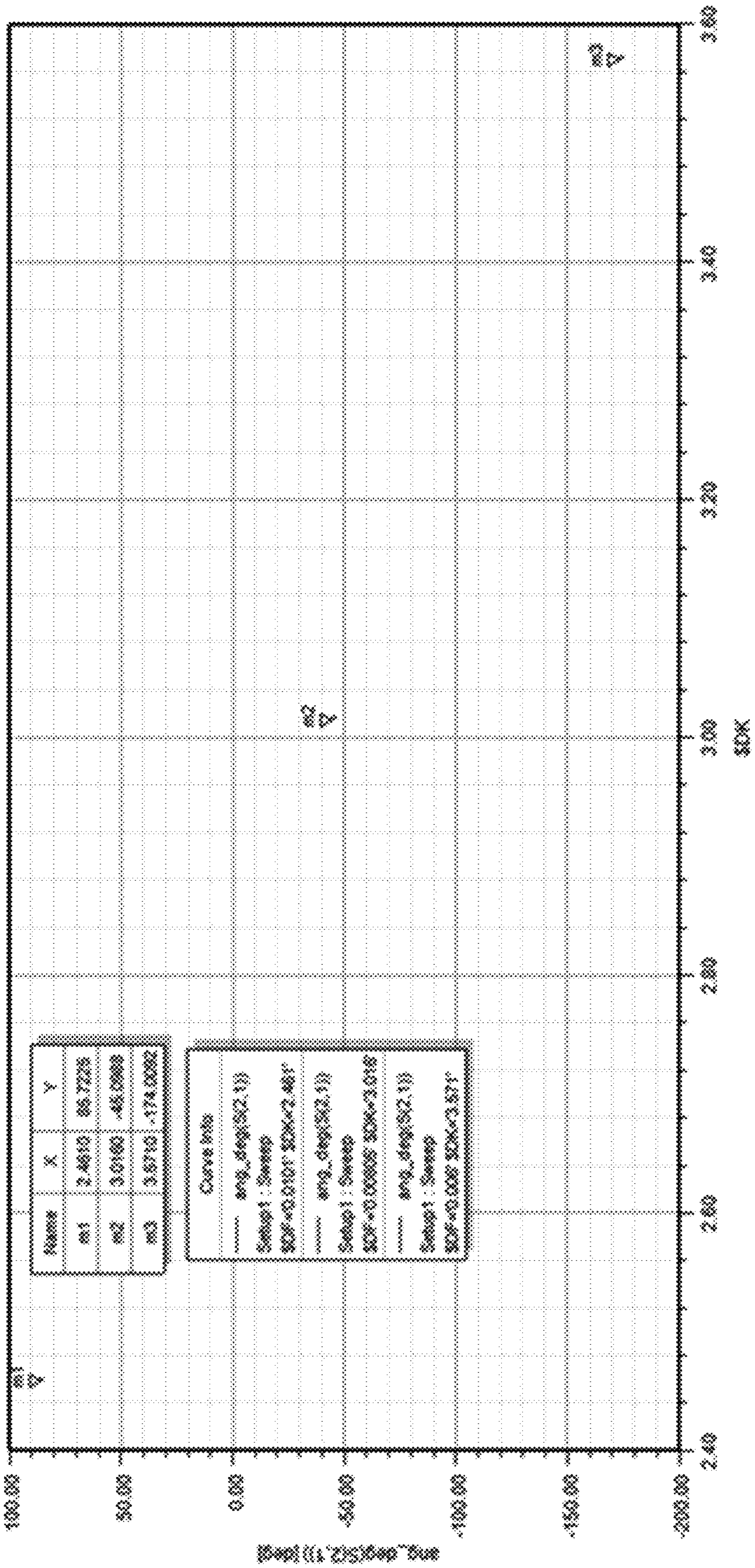
FIG. 25 shows a phase shift curve of a phase shifter in a fourth example of an embodiment of the present disclosure.

In order to make the performance of the phase shifter shown in FIG. 22 clearer, the phase shifter shown in FIG. 22 is simulated. FIG. 23 shows a S11 curve of the phase shifter in the fourth example of the embodiment of the present disclosure; FIG. 24 shows a S12 curve of the phase shifter in the fourth example of the embodiment of the present disclosure; and FIG. 25 shows a phase shift curve of the phase shifter in the fourth example of the embodiment of the present disclosure. As shown in FIGS. 23 to 25, it can be seen in FIG. 23 that S11 (FIG. 23) of the liquid crystal phase shifter in a frequency band from 11.31 GHz to 14.34 GHz is less than −10 dB, the insertion loss in a frequency band from 11.32 GHz to 14.18 GHz is less than 6 dB, thereby producing effective band-pass filtering effect, S12 at the operational frequency point of 12 GHz is −2.90 dB, and the amount of phase shift is 259.7° as shown in FIG. 25.

Figure 26:
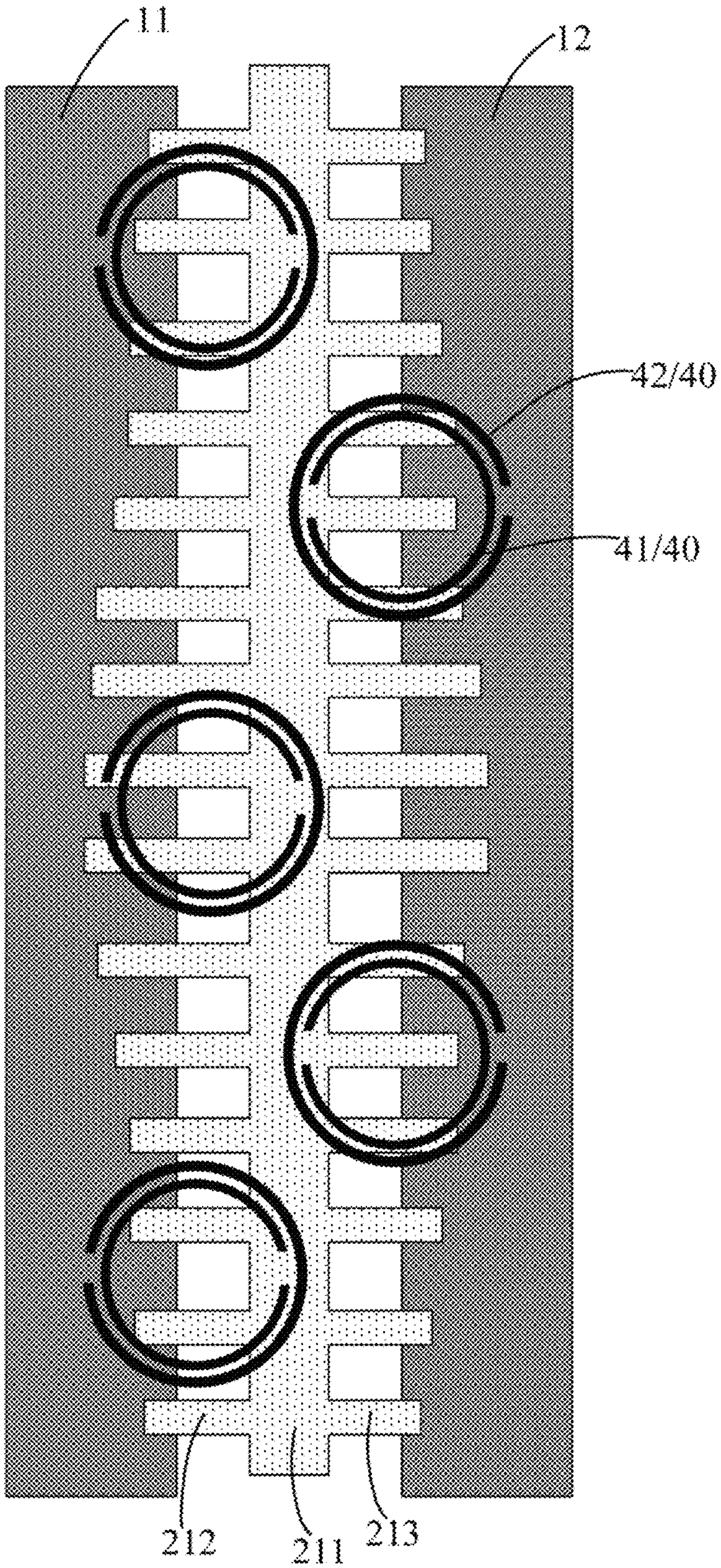
FIG. 26 is a top view of a phase shifter in a fifth example of an embodiment of the present disclosure.

A fifth example is as follows. FIG. 26 is a top view of the phase shifter in the fifth example of the embodiment of the present disclosure. As shown in FIG. 26, this example is substantially the same in structure as the second example, except that the split ring resonator 40 in this example is a circular split ring resonator 40. The rest of the structure is the same as that in the second example, and therefore, the description thereof is not repeated herein.

Figure 27:
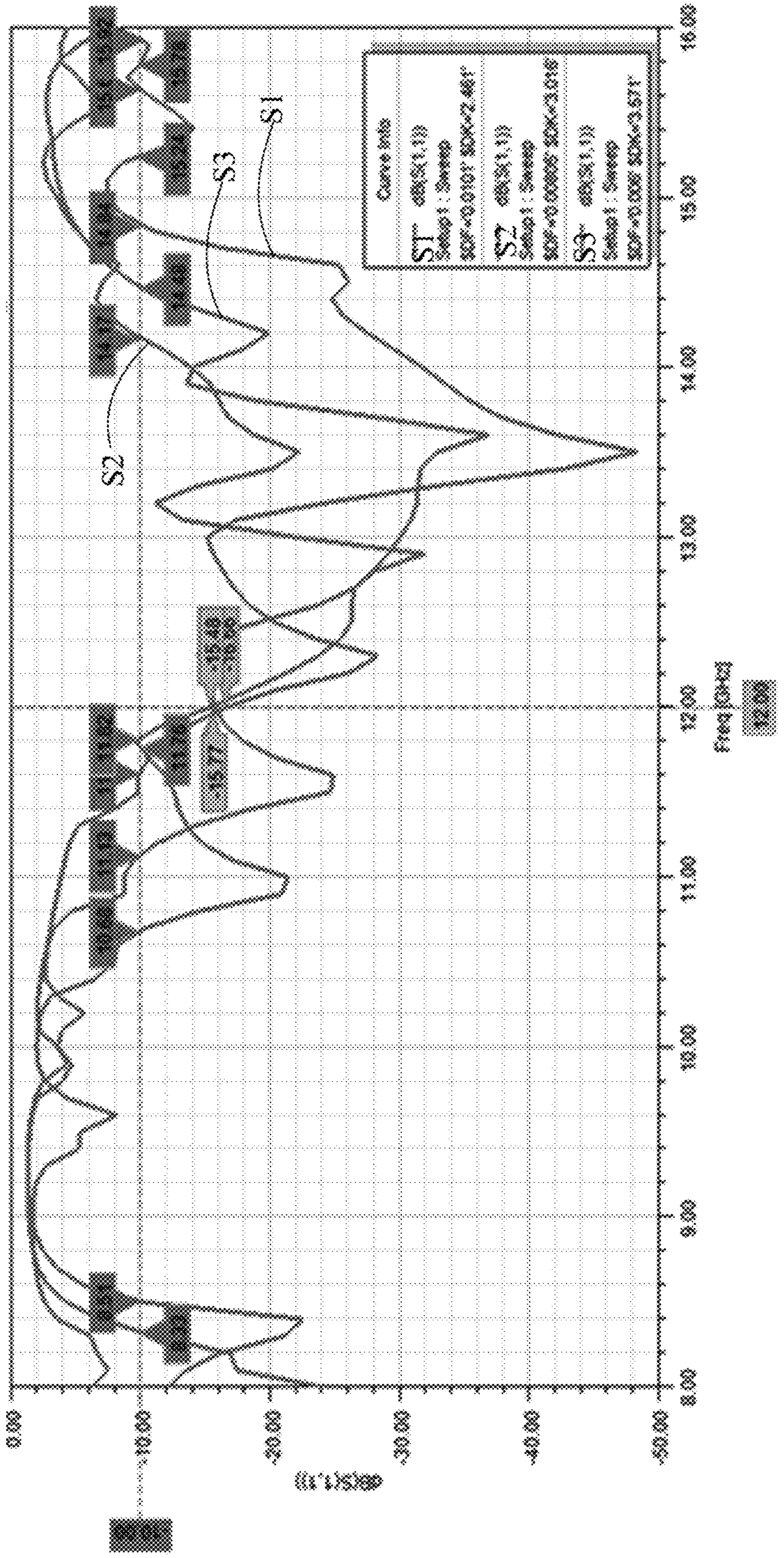
FIG. 27 shows a S11 curve of a phase shifter in a fifth example of an embodiment of the present disclosure.
Figure 28:
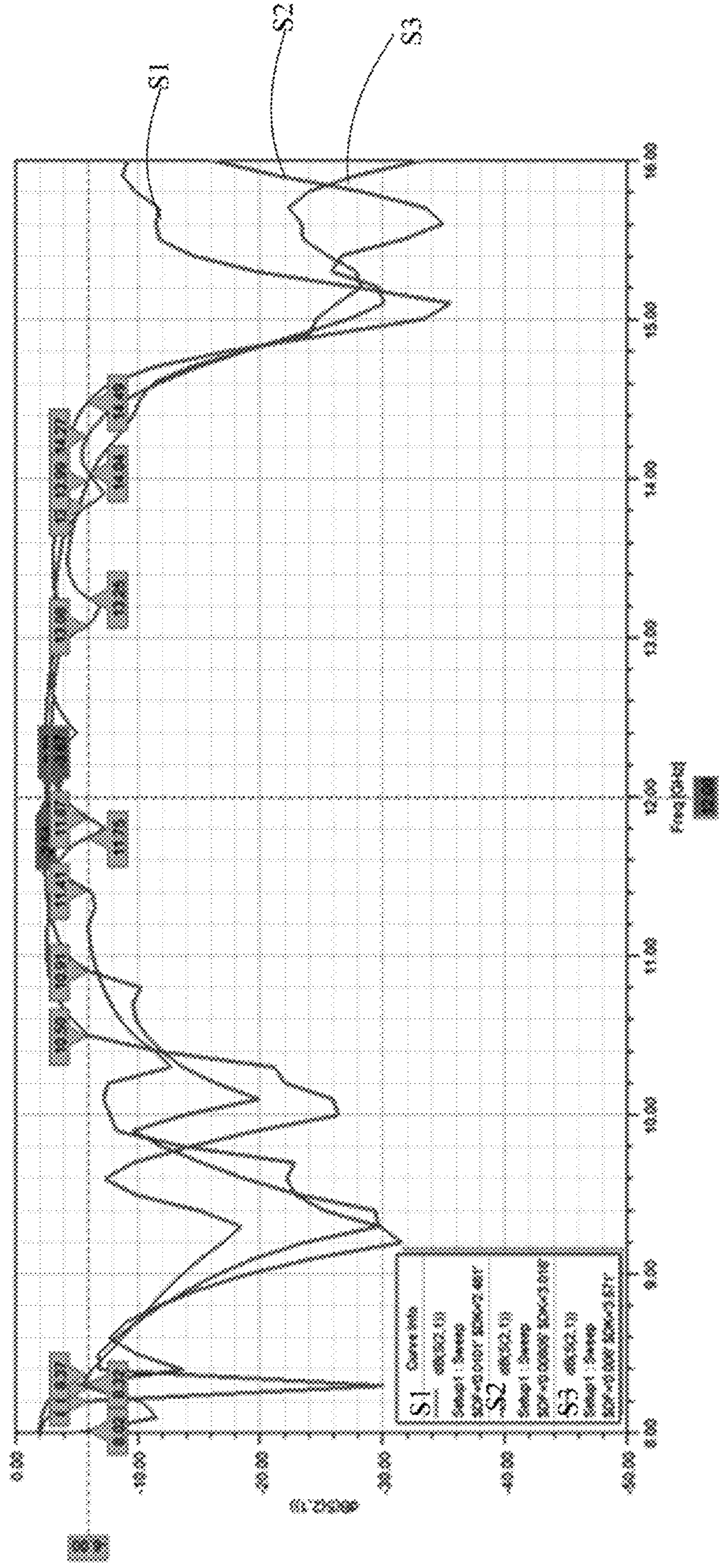
FIG. 28 shows a S12 curve of a phase shifter in a fifth example of an embodiment of the present disclosure.
Figure 29:
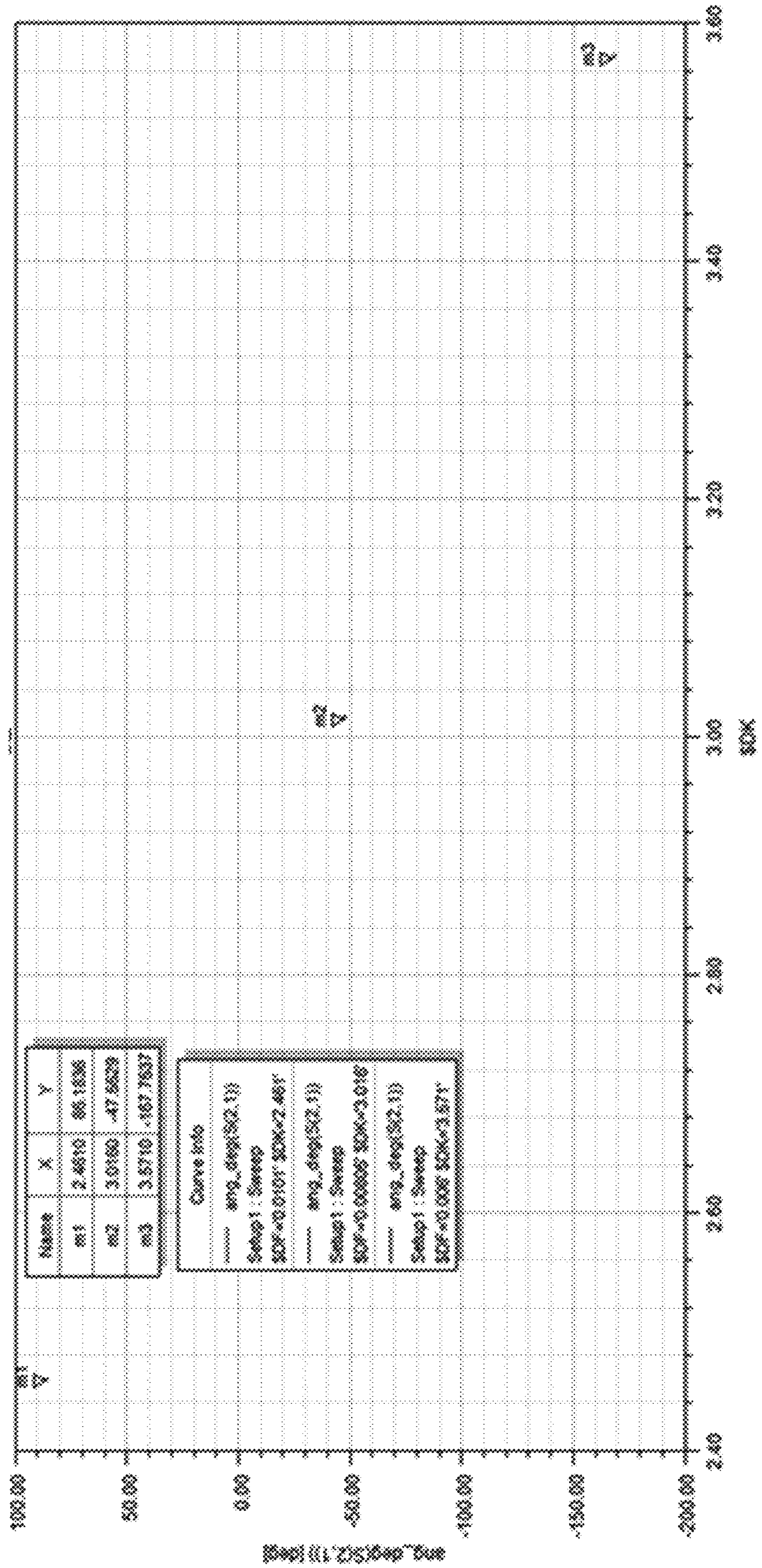
FIG. 29 shows a phase shift curve of a fifth example phase shifter according to an embodiment of the present disclosure.

In order to make the performance of the phase shifter shown in FIG. 26 clearer, the phase shifter shown in FIG. 26 is simulated. FIG. 27 shows a S11 curve of the phase shifter in the fifth example of the embodiment of the present disclosure; FIG. 28 shows a S12 curve of the phase shifter in the fifth example of the embodiment of the present disclosure; and FIG. 29 shows a phase shift curve of the phase shifter in the fifth example of the embodiment of the present disclosure. As shown in FIGS. 27 to 29, it can be seen in FIG. 27 that S11 (FIG. 27) of the liquid crystal phase shifter in a frequency band from 11.82 GHz to 14.17 GHz is less than −10 dB, the insertion loss in a frequency band from 11.87 GHz to 13.08 GHz is less than 6 dB, thereby producing effective band-pass filtering effect, S12 at the operational frequency point of 12 GHz is 3.67 dB, and the amount of phase shift is 253.9° as shown in FIG. 29. Compared with the fourth example, in the band-pass liquid crystal phase shifter corresponding to this embodiment, the −10 dB impedance bandwidth is reduced, the insertion loss is increased, and the range of band-pass filtering is narrowed due to the large insertion loss variation of the phase shifter under the high dielectric constant in this arrangement.

Figure 30:
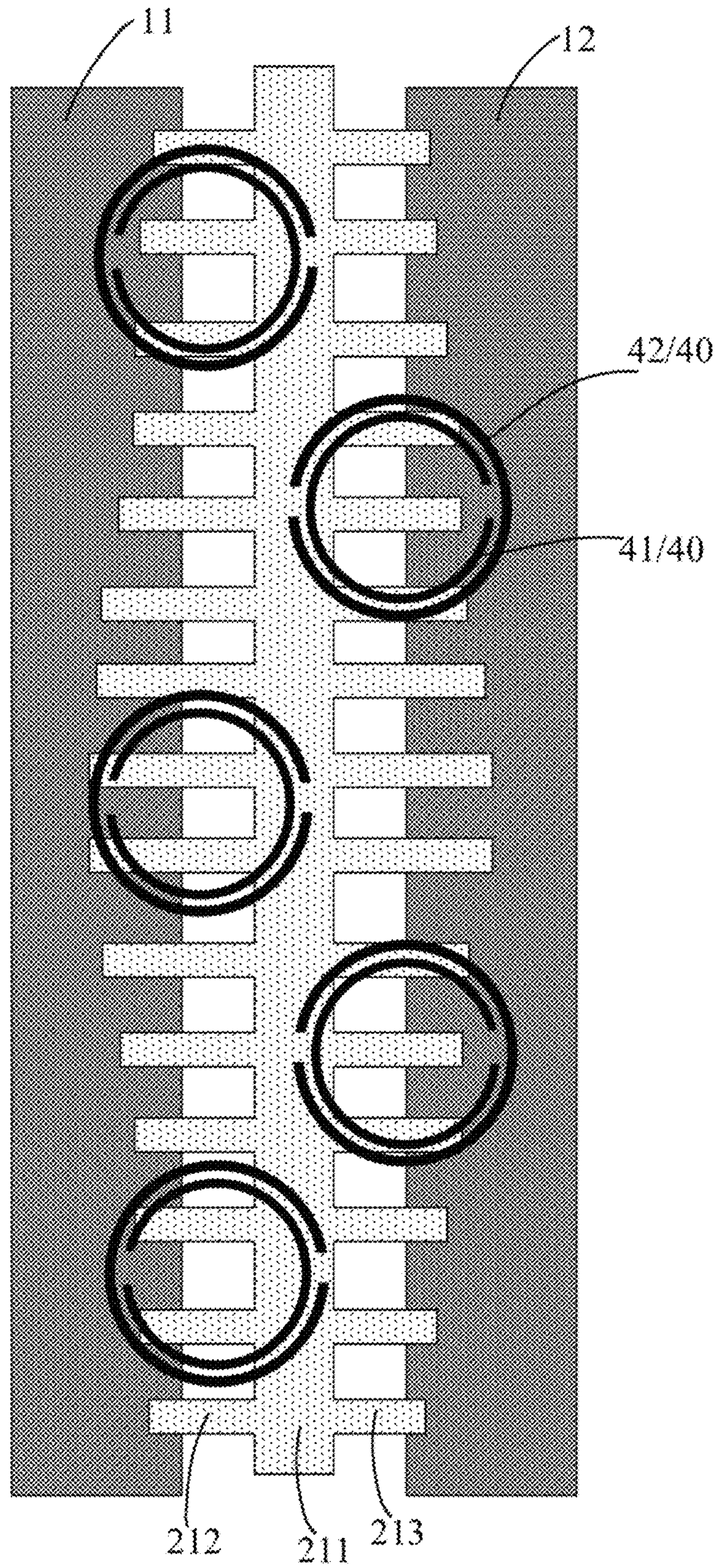
FIG. 30 is a top view of a phase shifter in a sixth example of an embodiment of the present disclosure.

A sixth example is as follows. FIG. 30 is a top view of the phase shifter in the sixth example of the embodiment of the present disclosure. As shown in FIG. 30, this example is substantially the same in structure as the fifth example, except that the orthographic projections of the splits of the outer rings 42 of the respective split ring resonators on the first dielectric substrate 10 (as shown in FIG. 2) are within the orthographic projection of the main structure 211 on the first dielectric substrate 10. For example, the orthographic projections of the splits of the outer rings 42 of the respective split ring resonators on the first dielectric substrate 10 are within the orthographic projection of the central line of the main structure 211 on the first dielectric substrate 10. The rest of the structure is the same as that in the fifth example, and therefore, the description thereof is not repeated herein.

Figure 31:
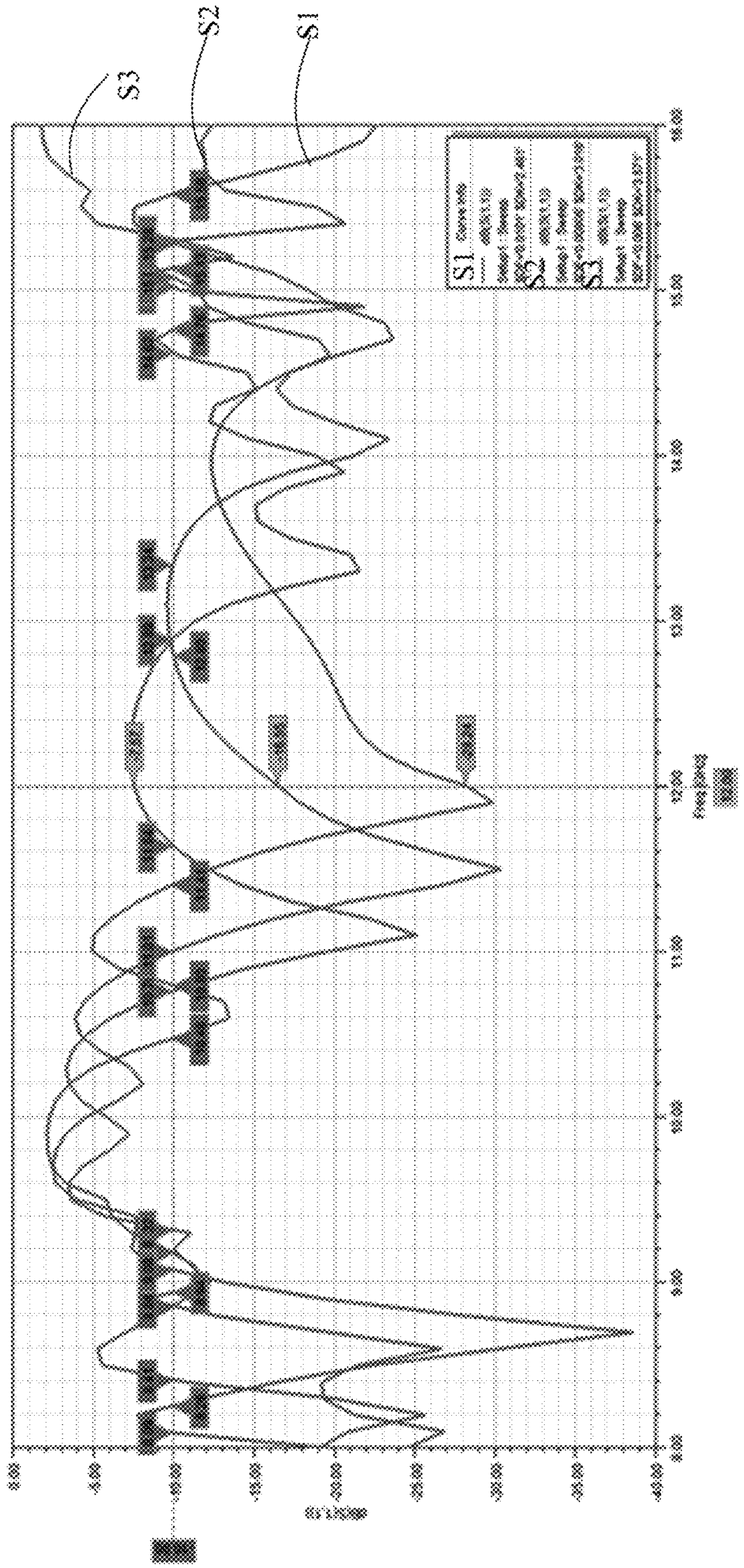
FIG. 31 shows a S11 curve of a phase shifter in a sixth example of an embodiment of the present disclosure.
Figure 32:
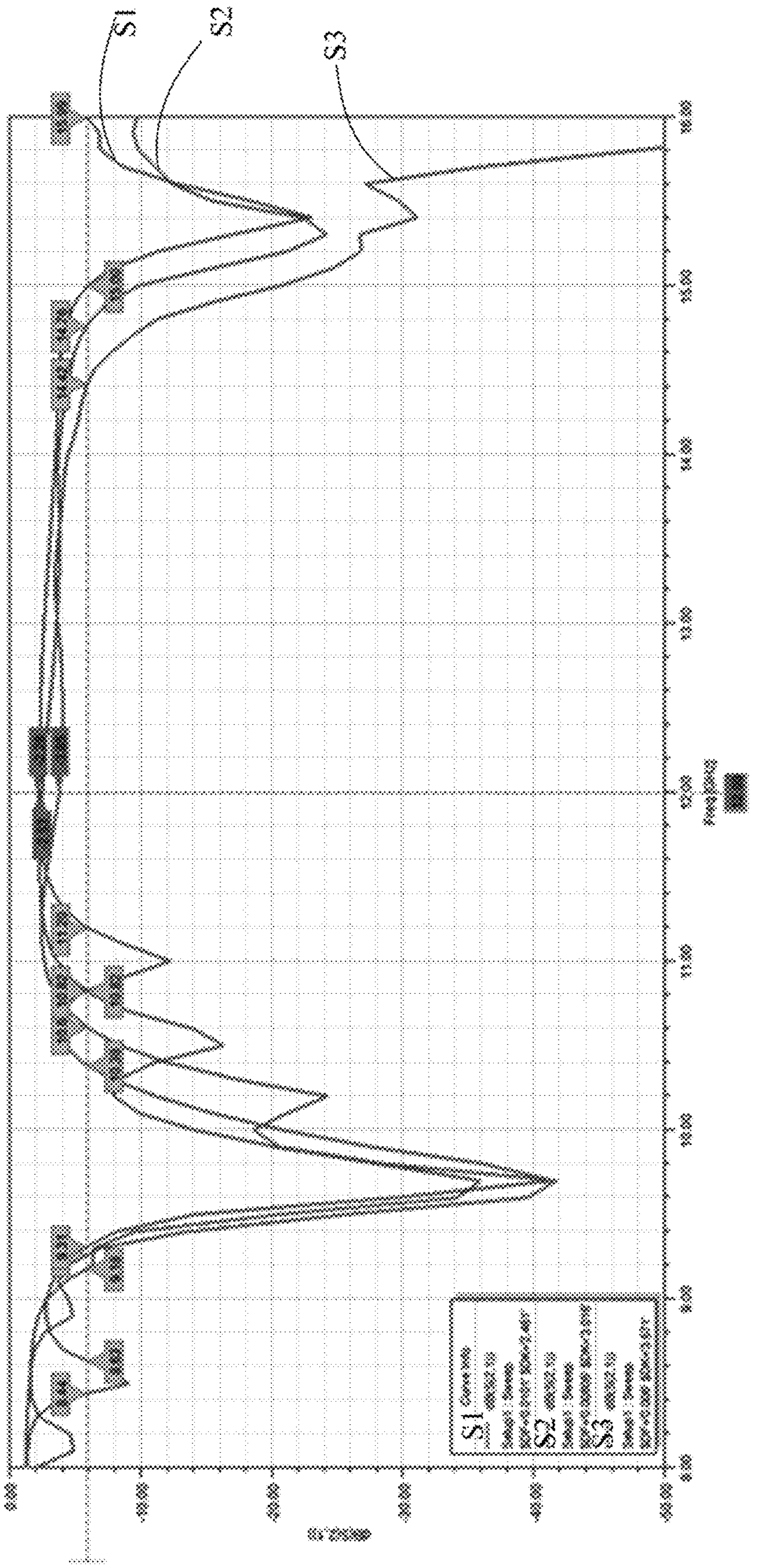
FIG. 32 shows a S12 curve of a phase shifter in a sixth example of an embodiment of the present disclosure.
Figure 33:
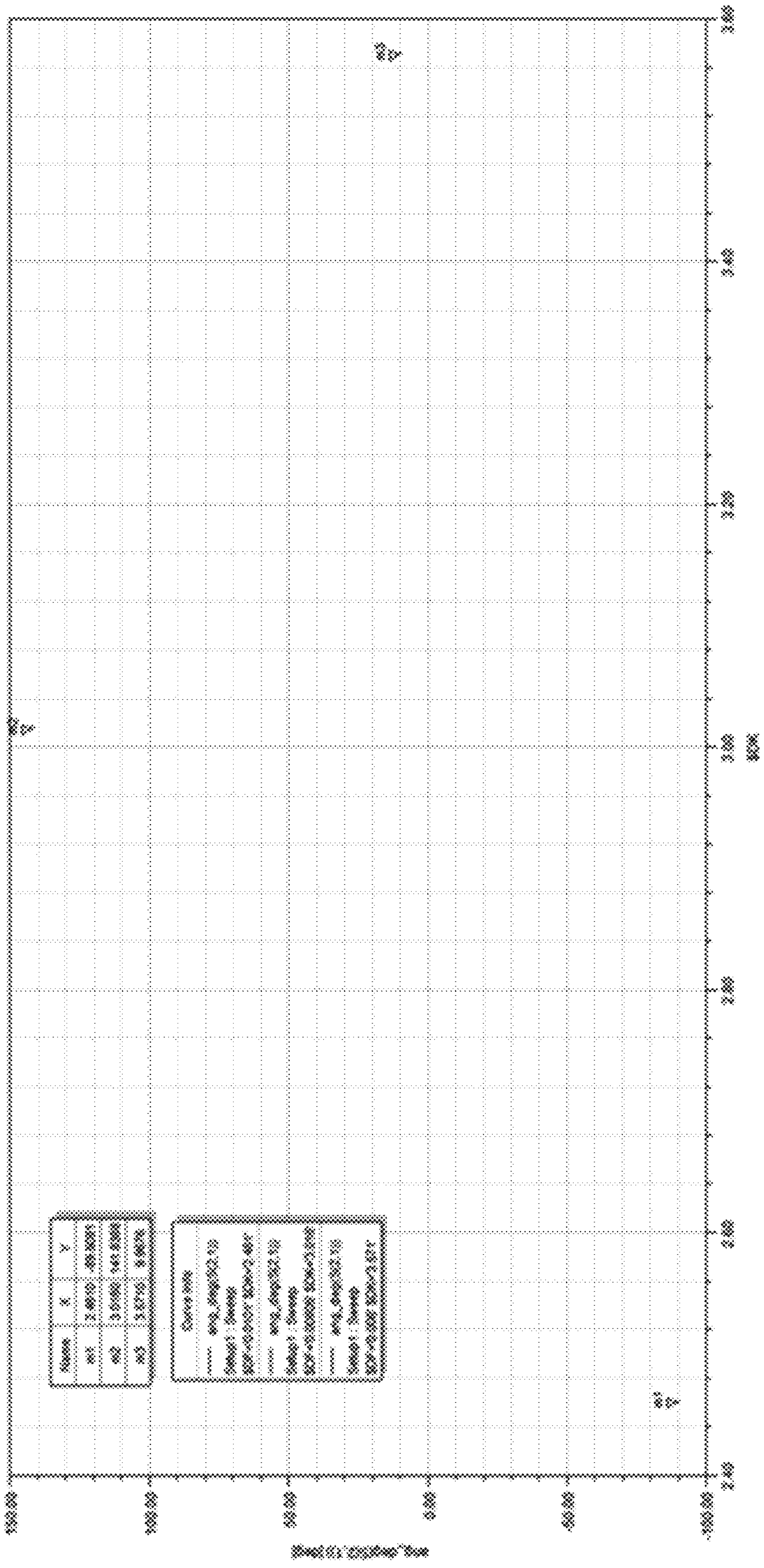
FIG. 33 shows a phase shift curve of a phase shifter in a sixth example of an embodiment of the present disclosure.

In order to make the performance of the phase shifter shown in FIG. 30 clearer, the phase shifter shown in FIG. 30 is simulated. FIG. 31 shows a S11 curve of the phase shifter in the sixth example of the embodiment of the present disclosure; FIG. 32 shows a S12 curve of the phase shifter in the sixth example of the embodiment of the present disclosure; and FIG. 33 shows a phase shift curve of the phase shifter in the sixth example of the embodiment of the present disclosure. As shown in FIGS. 31 to 33, it can be seen that although the insertion loss of the liquid crystal phase shifter is less than 6 dB in the frequency band from 11.20 GHz to 14.42 GHZ, a range of the band-pass filtering of the liquid crystal phase shifter is narrow (13.34 GHz to 14.42 GHZ) due to the fact that S11 (FIG. 31) of the liquid crystal phase shifter at some frequency points in the frequency band is greater than −10 dB, S12 at the operational frequency point of 12 GHz is 3.85 dB, and the amount of phase shift is 260.5° as shown in FIG. 33. Compared with the fourth and fifth embodiments, in the band-pass liquid crystal phase shifter corresponding to this embodiment, the −10 dB impedance bandwidth is reduced, the insertion loss is increased, and the amount of phase shift is slightly increased.

It should be noted that in each of FIGS. 3, 7, 11, 15, 19, 23, 27, and 31, the horizontal axis represents frequency, the vertical axis represents reflection coefficient, and curves S1, S2, and S3 represent the S11 curves of the phase shifter measured at different direct current (DC) voltages, under which the liquid crystal layer in the phase shifter has different dielectric constants (DKs) and dissipation factors (DFs); in each of FIGS. 4, 8, 12, 16, 20, 24, 28, and 32, the horizontal axis represents frequency in GHz, the vertical axis represents reverse transmission coefficient in dB, and curves S1, S2, and S3 represent the S12 curves of the phase shifter measure at different DC voltages, under which the liquid crystal layer in the phase shifter has different DKs and DFs values; and in each of FIGS. 5, 9, 13, 17, 21, 25, 29, and 33, the horizontal axis represents the DK of the liquid crystal layer in the phase shifter, the vertical axis represents the phase angle in degrees of the microwave signal, and points m1, m2, and m3 represent the phase angles of the microwave signal under different DC voltages. The phase shift of the phase shifter equals to an absolute value of the difference between the corresponding angles at points m1 and m3 in FIG. 5, 9, 13, 17, 21, 25, 29, or 33.

Figure 34:
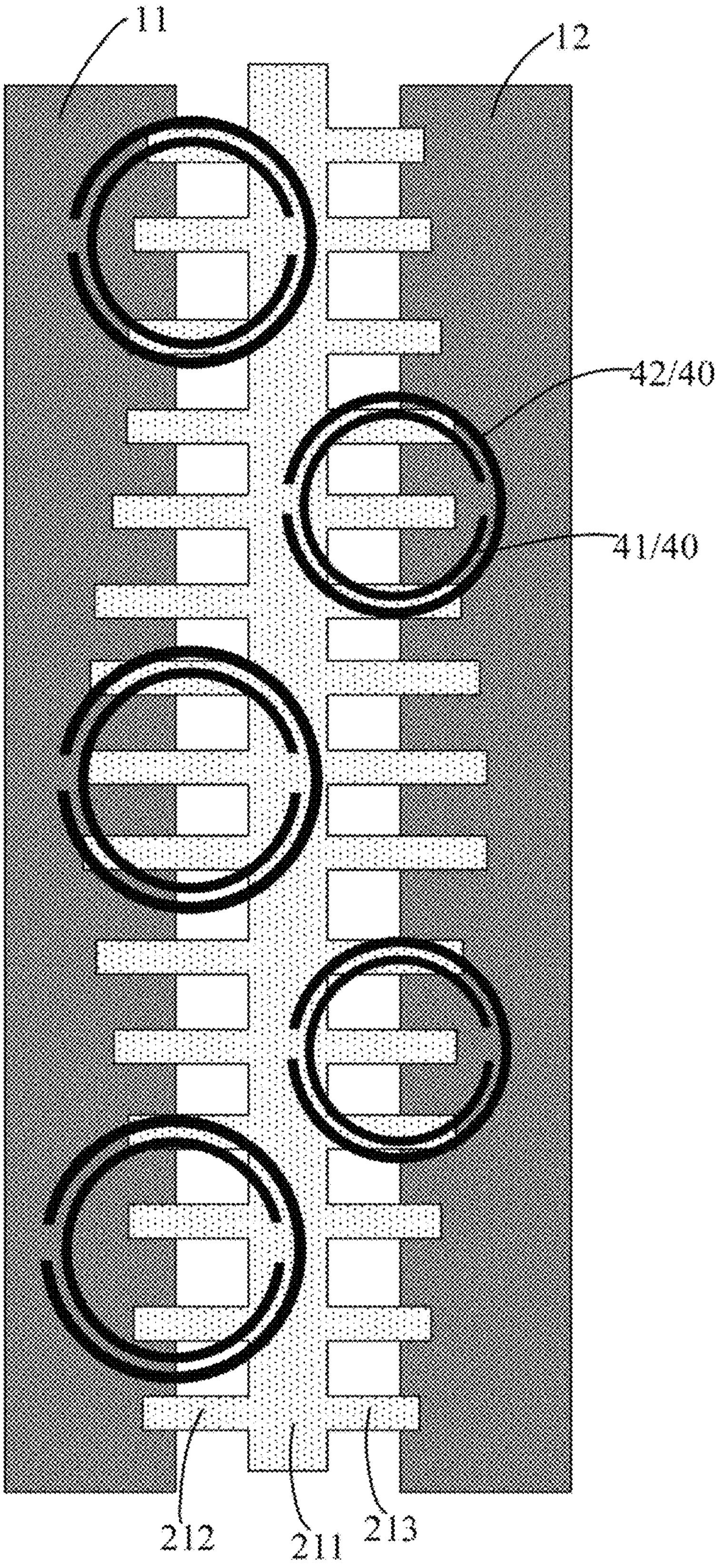
FIG. 34 is a top view of another phase shifter according to an embodiment of the present disclosure.

The above only shows structures of some exemplary phase shifters, and in a practical product, the size, the spacing, etc. of the split ring resonators 40 may be designed according to requirements on the performance of the phase shifter. For example, FIG. 34 is a top view of another phase shifter according to an embodiment of the present disclosure; as shown in FIG. 34, the sizes of the split ring resonators 40 in the phase shifter may alternatively be different from each other, for example, a design of split ring resonators 40 with one larger and one smaller staggered and alternately arranged is provided.

In a second aspect, an embodiment of the present disclosure provides an electronic device, which may include any one of the phase shifters described above.

In some examples, the electronic device provided by an embodiment of the present disclosure further includes a transceiving unit, a radio frequency transceiver, a signal amplifier, a power amplifier, and a filtering unit. The antenna in the communication device may serve as a transmitting antenna or a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the antenna in the communication system may transmit the signal to a receiving terminal in the transceiving unit after the signal is processed by the filtering unit, the power amplifier, the signal amplifier, and the radio frequency transceiver, where the receiving terminal may be, for example, an intelligent gateway.

Furthermore, the radio frequency transceiver is connected to the transceiving unit and is used for modulating the signals transmitted by the transceiving unit or for demodulating the signals received by the antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Furthermore, the radio frequency transceiver is connected to the signal amplifier and the power amplifier, the signal amplifier and the power amplifier are further connected to the filtering unit, and the filtering unit is connected to at least one antenna. In the process of transmitting a signal by the communication system, the signal amplifier is used for improving a signal-to-noise ratio of the signal output by the radio frequency transceiver and then transmitting the signal to the filtering unit; the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the antenna, and the antenna radiates the signal. In the process of receiving a signal by the communication system, the antenna receives the a signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal; the power amplifier amplifies a power of the signal received by the antenna. The signal received by the antenna is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the electronic device provided by an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various changes and modifications can be made without departing from the spirit and essence of the present disclosure, and these changes and modifications are to be considered within the scope of the present disclosure.

What is claimed is:

1. A phase shifter, comprising a first dielectric substrate and a second dielectric substrate opposite to each other, a first conductive pattern and a second conductive pattern on a side of the first dielectric substrate close to the second dielectric substrate, a third conductive pattern on a side of the second dielectric substrate close to the first dielectric substrate, and an adjustable dielectric layer between a layer where the first conductive pattern and the second conductive pattern are located and a layer where the third conductive pattern is located, wherein the third conductive pattern comprises a main structure, and a first branch and a second branch connected to the main structure on two sides of an extending direction of the main structure, respectively; an orthographic projection of the main structure on the first dielectric substrate is between orthographic projections of the first conductive pattern and the second conductive pattern on the first dielectric substrate; the orthographic projections of the first branch and the first conductive pattern on the first dielectric substrate partially overlap each other, and the orthographic projections of the second branch and the second conductive pattern on the first dielectric substrate partially overlap each other; and the phase shifter further comprises at least one split ring resonator on a side of the second dielectric substrate away from the third conductive pattern, and an orthographic projection of the at least one split ring resonator on the first dielectric substrate partially overlaps an orthographic projection of the third conductive pattern on the first dielectric substrate, wherein the at least one split ring resonator is a plurality of split ring resonators, and the plurality of split ring resonators are sequentially arranged along the extending direction of the main structure, wherein each of the plurality of split ring resonators comprises an outer ring and an inner ring nested within the outer ring, and positions of splits of the inner ring and of the outer ring are opposite to each other; any two adjacent ones of the plurality of split ring resonators are staggered, wherein an orthographic projection of the split of the inner ring of one of the two adjacent split ring resonators on the first dielectric substrate is within the orthographic projection of the main structure on the first dielectric substrate, and an orthographic projection of the split of the outer ring of the other one of two adjacent split ring resonators on the first dielectric substrate is within the orthographic projection of the main structure on the first dielectric substrate.

2. The phase shifter according to claim 1, wherein the first branch, the second branch, and the main structure are of a one-piece structure, and the adjustable dielectric layer is a liquid crystal layer.

3. An electronic device, comprising the phase shifter according to claim 1.

4. The phase shifter according to claim 1, wherein the orthographic projection of the split of the inner ring of one the two adjacent split ring resonators on the first dielectric substrate is within an orthographic projection of a center line of the main structure on the first dielectric substrate.

5. The phase shifter according to claim 1, wherein the first branch and the second branch are in one-to-one correspondence, and for the first branch and the second branch corresponding to each other, a region where the orthographic projections of the first branch and the first conductive pattern on the first dielectric substrate overlap each other is a first region, a region where the orthographic projections of the second branch and the second conductive pattern on the first dielectric substrate overlap each other is a second region, and the first region and the second region are equal in area.

6. The phase shifter according to claim 5, wherein each of regions where orthographic projections of the respective first branches and the first conductive pattern on the first dielectric substrate overlap each other is the first region, and areas of the respective first regions monotonically increase in a direction from each of two ends of the main structure toward a center of the main structure.

7. The phase shifter according to claim 6, wherein widths of the respective first branches are equal to each other, and lengths of the respective first branches monotonically increase in the direction from each of the two ends of the main structure toward the center of the main structure.

8. The phase shifter according to claim 6, wherein lengths of the respective first branches are equal to each other, and widths of the respective first branches monotonically increase in the direction from each of the two ends of the main structure toward the center of the main structure.

9. The phase shifter according to claim 1, wherein each of the at least one split ring resonator is a rectangular split ring resonator or a circular split ring resonator.

10. The phase shifter according to claim 1, wherein any two adjacent ones of the plurality of split ring resonators differ in size.

11. A phase shifter, comprising a first dielectric substrate and a second dielectric substrate opposite to each other, a first conductive pattern and a second conductive pattern on a side of the first dielectric substrate close to the second dielectric substrate, a third conductive pattern on a side of the second dielectric substrate close to the first dielectric substrate, and an adjustable dielectric layer between a layer where the first conductive pattern and the second conductive pattern are located and a layer where the third conductive pattern is located, wherein the third conductive pattern comprises a main structure, and a first branch and a second branch connected to the main structure on two sides of an extending direction of the main structure, respectively; an orthographic projection of the main structure on the first dielectric substrate is between orthographic projections of the first conductive pattern and the second conductive pattern on the first dielectric substrate; the orthographic projections of the first branch and the first conductive pattern on the first dielectric substrate partially overlap each other, and the orthographic projections of the second branch and the second conductive pattern on the first dielectric substrate partially overlap each other; and the phase shifter further comprises at least one split ring resonator on a side of the second dielectric substrate away from the third conductive pattern, and an orthographic projection of the at least one split ring resonator on the first dielectric substrate partially overlaps an orthographic projection of the third conductive pattern on the first dielectric substrate, wherein the at least one split ring resonator is a plurality of split ring resonators, and the plurality of split ring resonators are sequentially arranged along the extending direction of the main structure, wherein each of the plurality of split ring resonators comprises an outer ring and an inner ring nested within the outer ring, and positions of splits of the inner ring and of the outer ring are opposite to each other; and each of orthographic projections of centers of the plurality of split ring resonators on the first dielectric substrate is within the orthographic projection of the main structure on the first dielectric substrate.

12. The phase shifter according to claim 11, wherein a line connecting the orthographic projections of the centers of the plurality of split ring resonators on the first dielectric substrate coincides with an orthographic projection of a center line of the main structure on the first dielectric substrate.

13. The phase shifter according to claim 11, wherein orthographic projections of the splits of the inner rings of the plurality of split ring resonators on the first dielectric substrate are on a same side of the orthographic projection of the main structure on the first dielectric substrate; and orthographic projections of the splits of the outer rings of the plurality of split ring resonators on the first dielectric substrate are on a same side of the orthographic projection of the main structure on the first dielectric substrate.

14. An electronic device, comprising the phase shifter according to claim 11.

15. The phase shifter according to claim 11, wherein an extending direction of a line connecting orthographic projections of midpoints of the splits of the inner rings of the plurality of split ring resonators on the first dielectric substrate is the same as the extending direction of the main structure; and an extending direction of a line connecting orthographic projections of midpoints of the splits of the outer rings of the plurality of split ring resonators on the first dielectric substrate is the same as the extending direction of the main structure.

16. A phase shifter, comprising a first dielectric substrate and a second dielectric substrate opposite to each other, a first conductive pattern and a second conductive pattern on a side of the first dielectric substrate close to the second dielectric substrate, a third conductive pattern on a side of the second dielectric substrate close to the first dielectric substrate, and an adjustable dielectric layer between a layer where the first conductive pattern and the second conductive pattern are located and a layer where the third conductive pattern is located, wherein the third conductive pattern comprises a main structure, and a first branch and a second branch connected to the main structure on two sides of an extending direction of the main structure, respectively; an orthographic projection of the main structure on the first dielectric substrate is between orthographic projections of the first conductive pattern and the second conductive pattern on the first dielectric substrate; the orthographic projections of the first branch and the first conductive pattern on the first dielectric substrate partially overlap each other, and the orthographic projections of the second branch and the second conductive pattern on the first dielectric substrate partially overlap each other; and the phase shifter further comprises at least one split ring resonator on a side of the second dielectric substrate away from the third conductive pattern, and an orthographic projection of the at least one split ring resonator on the first dielectric substrate partially overlaps an orthographic projection of the third conductive pattern on the first dielectric substrate, wherein the at least one split ring resonator is a plurality of split ring resonators, and the plurality of split ring resonators are sequentially arranged along the extending direction of the main structure, wherein each of the plurality of split ring resonators comprises an outer ring and an inner ring nested within the outer ring, and positions of splits of the inner ring and of the outer ring are opposite to each other; any two adjacent ones of the plurality of split ring resonators are staggered, and each of orthographic projections of the splits of the inner rings of the plurality of split ring resonators on the first dielectric substrate is within the orthographic projection of the main structure on the first dielectric substrate or each of orthographic projections of the splits of the outer rings of the plurality of split ring resonators on the first dielectric substrate is within the orthographic projection of the main structure on the first dielectric substrate.

17. The phase shifter according to claim 16, wherein each of the orthographic projections of the splits of the inner rings of the plurality of split ring resonators on the first dielectric substrate is within an orthographic projection of a center line of the main structure on the first dielectric substrate.

18. The phase shifter according to claim 16, wherein each of the orthographic projections of the splits of the outer rings of the plurality of split ring resonators on the first dielectric substrate is within an orthographic projection of a center line of the main structure on the first dielectric substrate.

19. An electronic device, comprising the phase shifter according to claim 16.

* * * * *